United States Patent
Cousson et al.

(10) Patent No.: US 8,775,839 B2
(45) Date of Patent: Jul. 8, 2014

(54) GLOBAL HARDWARE SUPERVISED POWER TRANSITION MANAGEMENT CIRCUITS, PROCESSES AND SYSTEMS

(75) Inventors: Benoit Cousson, Saint Laurent du Var (FR); Patrick Titiano, Saint Laurent du Var (FR)

(73) Assignee: Texas Instruments Incorporated, Dallas, TX (US)

( * ) Notice: Subject to any disclaimer, the term of this patent is extended or adjusted under 35 U.S.C. 154(b) by 1513 days.

(21) Appl. No.: 12/354,351

(22) Filed: Jan. 15, 2009

(65) Prior Publication Data

US 2009/0204831 A1    Aug. 13, 2009

(30) Foreign Application Priority Data

Feb. 8, 2008    (EP) ..................... 08209119

(51) Int. Cl.
*G06F 1/00*    (2006.01)
*G06F 1/32*    (2006.01)

(52) U.S. Cl.
CPC .............. *G06F 1/324* (2013.01); *G06F 1/3253* (2013.01)
USPC .......................................................... 713/322

(58) Field of Classification Search
CPC .............................. G06F 1/324; G06F 1/3253
USPC .......................................... 710/107; 713/322
See application file for complete search history.

(56) References Cited

U.S. PATENT DOCUMENTS

| | | | |
|---|---|---|---|
| 5,594,895 A * | 1/1997 | Raymond et al. | 713/501 |
| 5,642,489 A * | 6/1997 | Bland et al. | 710/308 |
| 5,692,202 A * | 11/1997 | Kardach et al. | 713/324 |
| 6,530,027 B1 * | 3/2003 | Morita | 713/322 |
| 6,643,792 B1 * | 11/2003 | Kurosawa | 713/501 |
| 6,668,330 B1 * | 12/2003 | Kapil | 713/322 |
| 6,795,000 B1 * | 9/2004 | Hummerston et al. | 341/141 |
| 6,959,395 B2 * | 10/2005 | Ma | 713/310 |
| 7,237,128 B2 | 6/2007 | Naveh et al. | |
| 7,596,638 B2 * | 9/2009 | Lee et al. | 710/18 |
| 7,689,847 B2 * | 3/2010 | Chang et al. | 713/322 |
| 8,321,706 B2 * | 11/2012 | Zhang et al. | 713/323 |
| 2005/0083743 A1 * | 4/2005 | Andrei et al. | 365/202 |
| 2005/0216643 A1 | 9/2005 | Munguia | |
| 2006/0080477 A1 | 4/2006 | Seigneret et al. | |
| 2007/0208964 A1 | 9/2007 | Sandon et al. | |

(Continued)

OTHER PUBLICATIONS

PCI Mobile Design Guide version 1.1 Dec. 18, 1998, pp. 1-40.*

*Primary Examiner* — Paul R Myers
(74) *Attorney, Agent, or Firm* — Ronald O. Neerings; Frederick J. Telecky, Jr.

(57) ABSTRACT

An electronic circuit including a bus (3521), a peripheral (3510.*i*/3552.1) coupled to the bus (3521), the peripheral having a storing circuit (3620.*i*, 3625.*i*) for a succession-presetting and a parameter setting currently-effective for peripheral operation on the bus (3521); and a power management circuit (3570) operable in response to a power management transition request (GO_bit) to send a first signal (START_bit_i) to the peripheral, and to initiate a bus frequency transition, and to send a second signal (PER_ENABLE_i) to the peripheral after the bus frequency transition; and the peripheral is responsive to the first signal (START_bit_i) to stall peripheral operation on the bus (3521), the peripheral operable to automatically promote the succession pre-setting to currently-effective status for the peripheral after peripheral operations on the bus (3521) are stalled and responsive to the second signal (PER_ENABLE_i) to re-enable peripheral operation on the bus (3521). Other circuits, devices, systems, apparatus, and processes are disclosed.

22 Claims, 18 Drawing Sheets

(56) References Cited

U.S. PATENT DOCUMENTS

| | | |
|---|---|---|
| 2008/0059823 A1 | 3/2008 | Balatsos et al. |
| 2008/0129749 A1 | 6/2008 | Wiley et al. |
| 2008/0161071 A1 | 7/2008 | Sherman |
| 2008/0162770 A1 | 7/2008 | Titiano et al. |
| 2008/0235444 A1 | 9/2008 | Gower et al. |
| 2008/0263254 A1 | 10/2008 | Su et al. |
| 2008/0307240 A1 | 12/2008 | Dahan et al. |

* cited by examiner

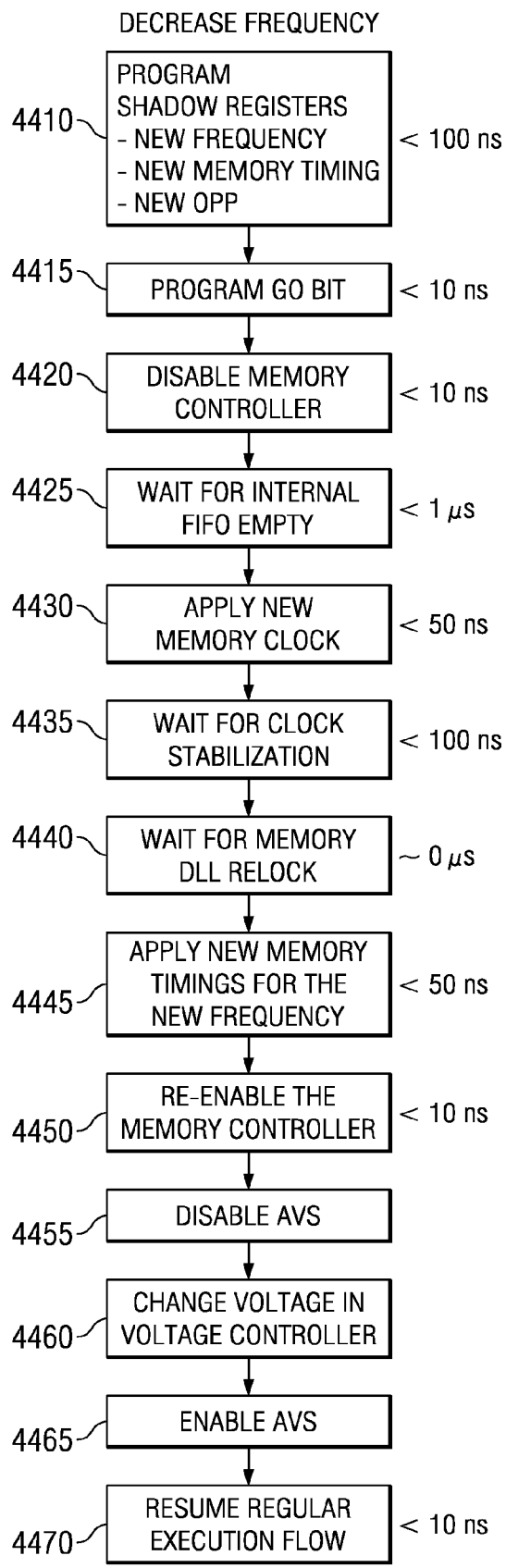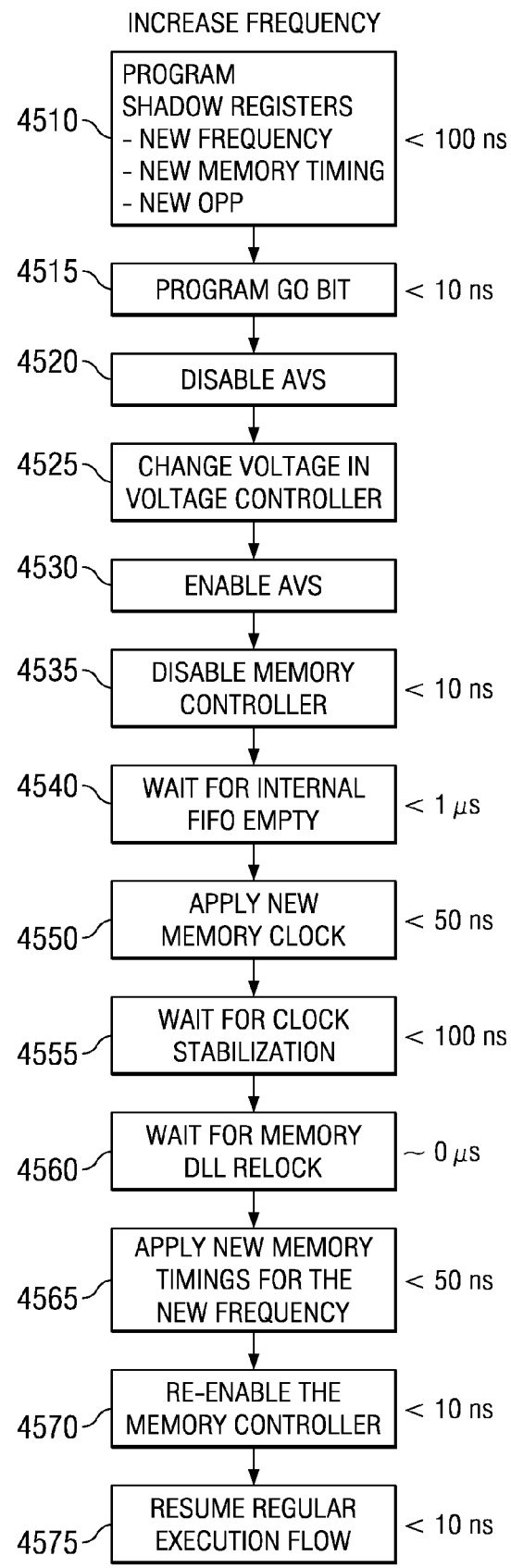
FIG. 7
FIG. 8

GLOBAL HARDWARE SUPERVISED POWER TRANSITION MANAGEMENT CIRCUITS, PROCESSES AND SYSTEMS

CROSS-REFERENCE TO RELATED APPLICATIONS

This application is related to European Patent Application Number 08209119.0 filed Feb. 8, 2008, titled "Global HW Supervised DVFS Transition" and priority is claimed under the Paris Convention and 35 U.S.C. 119 and all other applicable law.

This application is related to US patent application publication 2008-0307240, dated Dec. 11, 2008, and U.S. patent application Ser. No. 11/760,263 filed Jun. 8, 2007, titled "Power Management Electronic Circuits, Systems And Methods And Processes Of Manufacture" and said U.S. patent application documents are incorporated herein by reference.

This application is related to US patent application publication 2008-0162770, dated Jul. 3, 2008, and U.S. patent application Ser. No. 11/953,999 filed Dec. 11, 2007, titled "Power Management Electronic Circuits, Systems And Methods And Processes Of Manufacture" and said U.S. patent application documents are incorporated herein by reference.

STATEMENT REGARDING FEDERALLY SPONSORED RESEARCH OR DEVELOPMENT

Not applicable.

COPYRIGHT NOTIFICATION

Portions of this patent application contain materials that are subject to copyright protection. The copyright owner has no objection to the facsimile reproduction by anyone of the patent document, or the patent disclosure, as it appears in the United States Patent and Trademark Office and the European Patent Office, but otherwise reserves all copyright rights whatsoever.

BACKGROUND OF THE INVENTION

This invention is in the field of electronic computing hardware and software and communications, and is more specifically directed to improved circuits, devices, and systems for power management and information and communication processing, and processes of operating and making them. Without limitation, the background is further described in connection with communications processing.

Mobile telephony can communicate video and digital data, and voice over packet (VoP or VoIP), in addition to cellular voice. Streams of information such as video, voice, audio content, images of all kinds, and data should be flexibly handled by such mobile devices and platforms. But power dissipation can limit time between battery recharges and limit the features and number of applications running. And system latency can cause various kinds of delays and lapses in desirable application operation.

Security technology can improve the security of electronic retail and other commercial transactions, and of medical and other communications where privacy is important. Security may impose still further demands on computing power and hardware and compatible power management and user experience. Wireless mesh networks offer wideband multi-media transmission and reception that call for substantial computing power and hardware. Numerous other wireless technologies exist and are emerging about which various burdens and demands for power management exist and will arise.

Processors of various types, including DSP (digital signal processing) chips, RISC (reduced instruction set computing), information storage memories and/or other integrated circuit blocks and devices are important to these systems and applications. Containing or reducing energy dissipation, system latency and the cost of manufacture while providing a variety of circuit and system products with performance features for different market segments are important goals in integrated circuits generally and system-on-a-chip (SOC) design.

Further advantageous solutions and alternative solutions would, accordingly, be desirable

SUMMARY OF THE INVENTION

Generally and in one form of the invention, an electronic circuit includes a bus, a peripheral coupled to the bus, the peripheral having a storing circuit for a succession-presetting and a parameter setting currently-effective for peripheral operation on the bus; and a power management circuit operable in response to a power management transition request to send a first signal to the peripheral, and to initiate a bus frequency transition, and to send a second signal to the peripheral after the bus frequency transition; and the peripheral is responsive to the first signal to stall peripheral operation on the bus, the peripheral operable to automatically promote the succession pre-setting to currently-effective status for the peripheral after peripheral operations on the bus are stalled and responsive to the second signal to re-enable peripheral operation on the bus.

Generally, and in another form of the invention, a power management article includes an input for a power management transition request, an output for a transition initiation signal, an input for a transition initiation acknowledgment, an output for a frequency control, an input for a frequency stabilization signal, an output for a transition completion signal, and a state machine responsive to the input for the power management transition request to activate the output for a transition initiation signal and then responsive to the input for the transition initiation acknowledgment to activate the output for the frequency control and then responsive to the input for the frequency stabilization signal to activate the output for the transition completion signal.

Generally, and in a further form of the invention, an electronic peripheral includes a functional circuit for establishing peripheral functionality, a bus interface circuit coupled to said storage circuit, a storage circuitry coupled to said functional circuit and to said bus interface circuit, said storage circuit having a data buffer and a space for successively applicable power management related control parameter values, and a peripheral controller responsive to a transition initiation signal to disable at least part of the bus interface circuit, and to transfer current effectiveness between the least two of the successively applicable power management related control parameter values, and responsive to a re-enabling signal to re-enable the disabled part of the bus interface circuit.

Generally, and in an additional form of the invention, an electronic image processing system includes processing circuitry operable for image processing, a bus coupled to said processing circuitry, an image peripheral coupled to said bus, the image peripheral having a storing circuit for a succession-presetting and a parameter setting currently-effective for image peripheral operation on said bus, said processor operable to pre-program the succession presetting in the image peripheral and to generate a power management transition request, and a power management circuit operable in response to the power management transition request to send a first signal to said image peripheral, and to initiate a bus frequency transition, and to send a second signal to the image peripheral after the bus frequency transition, and said image peripheral is responsive to the first signal to stall image peripheral operation on said bus, said image peripheral operable to automatically promote the succession pre-setting to currently-effective status for the image peripheral after image peripheral operations on said bus are stalled and responsive to the second signal to re-enable image peripheral operation on said bus.

Generally, a manufacturing process form of the invention includes preparing design code representing a peripheral having a bus interface and a register field for a current setting related to power management and a register field for a shadow setting related to power management and a power management circuit coupled to the peripheral to stall the bus interface and promote a shadow setting to the current setting, and re-enable the bus interface, and making at least one integrated circuit by wafer fabrication responsive to said design code.

These and other circuit, device, system, apparatus, process, and other forms of the invention are disclosed and claimed.

BRIEF DESCRIPTION OF THE DRAWINGS

FIG. 7 is a flow diagram of an inventive process for decreasing both voltage and frequency in a power transition including fast transition operations.

FIG. 8 is a flow diagram of an inventive process for increasing both voltage and frequency in a power transition including fast transition operations.

Corresponding numerals in different figures indicate corresponding parts except where the context indicates otherwise.

DETAILED DESCRIPTION OF EMBODIMENTS

Figure 1:
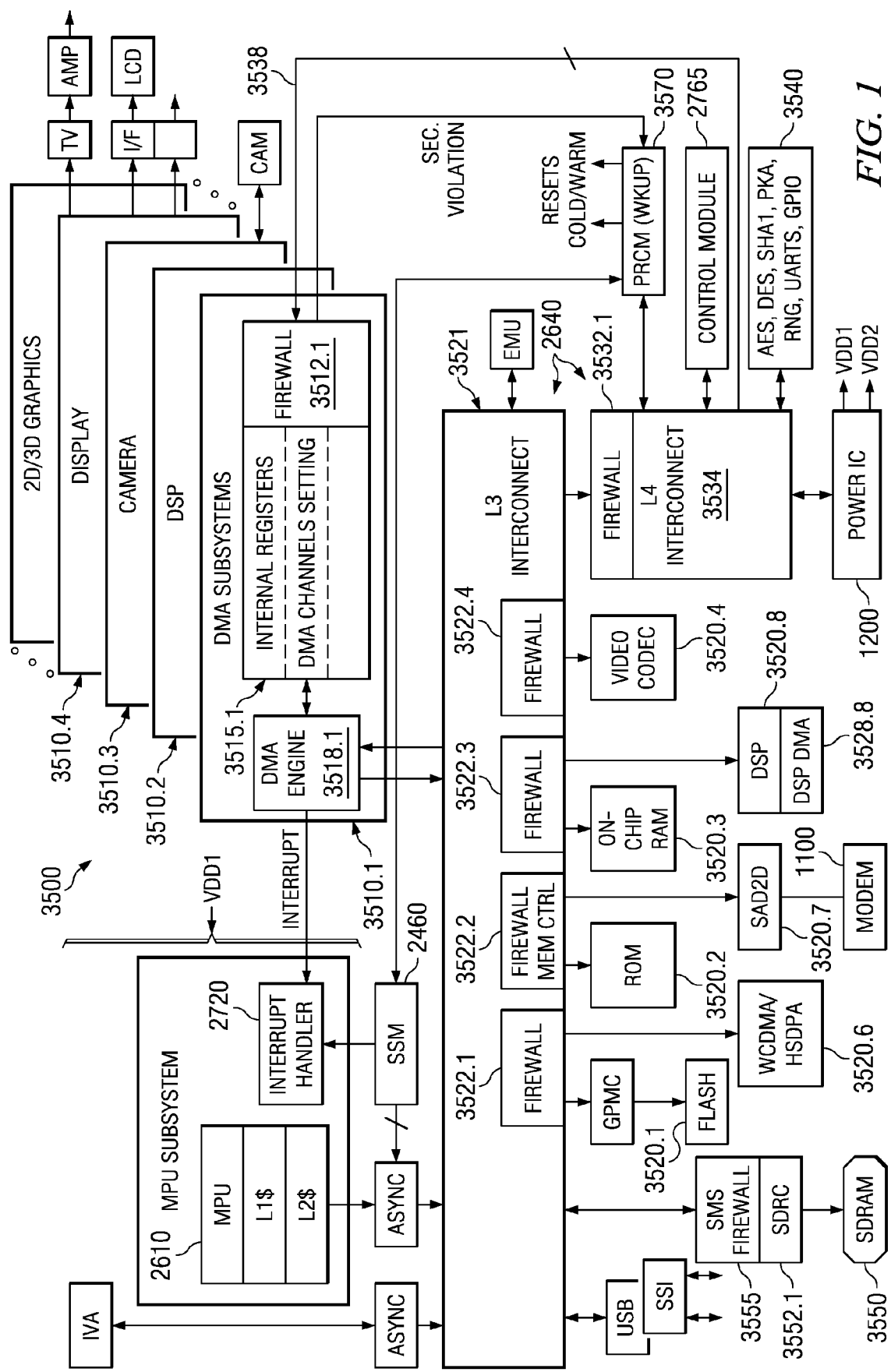
FIG. 1 is a block diagram of an electronic system such as for a system on a chip (SoC) inventively improved as shown in the other Figures, and the electronic system including a Power, Resets, and Control Manager (PRCM), processors, interconnect bus, and peripherals.

In FIG. 1, a system 3500 has an MPU subsystem, an IVA subsystem, and DMA (Direct Memory Access) subsystems 3510.*i*. The MPU subsystem suitably has one or more processors with CPUs such as RISC or CISC processors 2610, and having superscalar processor pipeline(s) with L1 and L2 caches. The IVA subsystem has one or more programmable digital signal processors (DSPs), such as processors having single cycle multiply-accumulates for image processing, video processing, and audio processing. IVA provides multi-standard (MPEG4, WMV9, RealVideo®, H.263, H.264) encode/decode at D1 (720×480 pixels), and 720 p MPEG4 decode, for some examples. Also integrated are a 2D/3D graphics engine, a Mobile DDR Interface, and numerous integrated peripherals as selected for a particular system solution. The IVA subsystem has L1 and L2 caches, RAM and ROM, and hardware accelerators as desired such as for motion estimation, variable length codec, and other processing. DMA (direct memory access) performs target accesses via target firewalls 3522.*i* and 3512.*i* of FIG. 1 connected on interconnects 2640. A target is a circuit block targeted or accessed by another circuit block operating as an initiator. In order to perform such accesses the DMA channels in DMA subsystems 3510.*i* are programmed. Each DMA channel specifies the source location of the Data to be transferred from an initiator and the destination location of the Data for a target.

Data exchange between a peripheral subsystem and a memory subsystem and general system transactions from memory to memory are handled by the System SDMA 3510.1. Data exchanges within a DSP subsystem 3510.2 are handled by the DSP DMA 3518.2. Data exchange to store camera capture is handled using a Camera DMA 3518.3 in camera subsystem CAM 3510.3. The CAM subsystem 3510.3 suitably handles one or two camera inputs of either serial or parallel data transfer types, and provides image capture hardware image pipeline and preview. Data exchange to refresh a display is handled in a display subsystem 3510.4 using a DISP DMA 3518.4. This subsystem 3510.4, for instance, includes a dual output three layer display processor for 1×Graphics and 2×Video, temporal dithering (turning pixels on and off to produce grays or intermediate colors) and SDTV to QCIF video format and translation between other video format pairs. The Display block 3510.4 feeds an LCD panel using either a serial or parallel interface. Also television output TV and Amp provide CVBS or S-Video output and other television output types.

In FIG. 1, a hardware security architecture including SSM 2460 propagates qualifiers on the interconnect 3521 and 3534. The MPU 2610 issues bus transactions and sets some qualifiers on Interconnect 3521. SSM 2460 also provides one or more MreqSystem qualifiers. The bus transactions propagate through the L4 Interconnect 3534 and then reach a DMA Access Properties Firewall 3512.1. Transactions are coupled to a DMA engine 3518.i in each subsystem 3510.i which supplies a subsystem-specific interrupt to the Interrupt Handler 2720. Interrupt Handler 2720 is also fed one or more interrupts from Secure State Machine SSM 2460 that performs security protection functions. Interrupt Handler 2720 outputs interrupts for MPU 2610. In FIG. 1, firewall protection by firewalls 3522.i is provided for various system blocks 3520.i, such as GPMC (General Purpose Memory Controller) to Flash memory 3520.1, ROM 3520.2, on-chip RAM 3520.3, Video Codec 3520.4, WCDMA/HSDPA 3520.6, device-to-device SAD2D 3520.7 to Modem chip 1100, and a DSP 3520.8 and DSP DMA 3528.8. A System Memory Interface SMS with SMS Firewall 3555 is coupled to SDRC 3552.1 (External Memory Interface EMIF with SDRAM Refresh Controller) and to system SDRAM 3550 (Synchronous Dynamic Random Access Memory).

Various initiators in the system are assigned multi-bit identifying codes designated ConnID. Each initiator generates its particular ConnID code on a bus in operation. Some Initiators are MPU 2610, DSP DMA 3510.2, SDMA 3510.1, Universal Serial Bus USB HS, virtual processor data read/write and instruction access, virtual system direct memory access, display 3510.4 such as LCD (liquid crystal display), memory management for digital signal processor DSP MMU (memory management unit), camera 3510.3, and a secure debug access port to emulation block EMU.

The DMA channels support interconnect qualifiers collectively designated MreqInfo, such as MreqSecure, MreqPrivilege, MreqSystem in order to regulate access to different protected memory spaces. The system configures and generates these different access qualifiers in a security robust way and delivers them to hardware firewalls 3512.1, 3512.2, etc. via lines 3538 as well as to firewalls 3522.1, 3522.2, etc. associated with some or all of the targets. The hardware firewalls protect the targets according to different access rights of initiators. The DMA channels 3515.1, .2, etc. are configurable through the L4 Interconnect 3534 by the MPU 2610. A circuitry example provides a Firewall configuration on a DMA L4 Interconnect interface that restricts different DMA channels according to the configuration previously written to configuration register fields. This Firewall configuration implements hardware security architecture rules in place to allow and restrict usage of the DMA channel qualifiers used in attempted accesses to various targets. When an attempt to configure access for DMA channels in a disallowed way is detected, in-band errors are sent back to the initiator that made the accesses and out-band errors are generated to a Control Module 2765 and converted into an MPU Interrupt for security attack detection and neutralization.

In FIG. 1, interconnect 3534 is also coupled to Control Module 2765 and cryptographic accelerators block 3540 and PRCM 3570. Power, Reset and Clock Manager PCRM 3570 is coupled via L4 interconnect 3534 to Power IC circuitry in chip 1200 of FIGS. 1-3, which supplies controllable supply voltages VDD1, VDD2, etc. PRCM 3570 is coupled to L4 Interconnect 3534 and coupled to Control Module 2765. PRCM 3570 is coupled to a DMA Firewall 3512.1 to receive a Security Violation signal, if a security violation occurs, and to respond with a Cold or Warm Reset output. Also PRCM 3570 is coupled to the SSM 2460.

In FIG. 1, some embodiments have symmetric multiprocessing (SMP) core(s) such as RISC processor cores in the MPU subsystem. One of the cores is called the SMP core. A hardware (HW) supported secure hypervisor runs at least on the SMP core. Linux SMP HLOS (high-level operating system) is symmetric across all cores and is chosen as the master HLOS in some embodiments.

Figure 2:
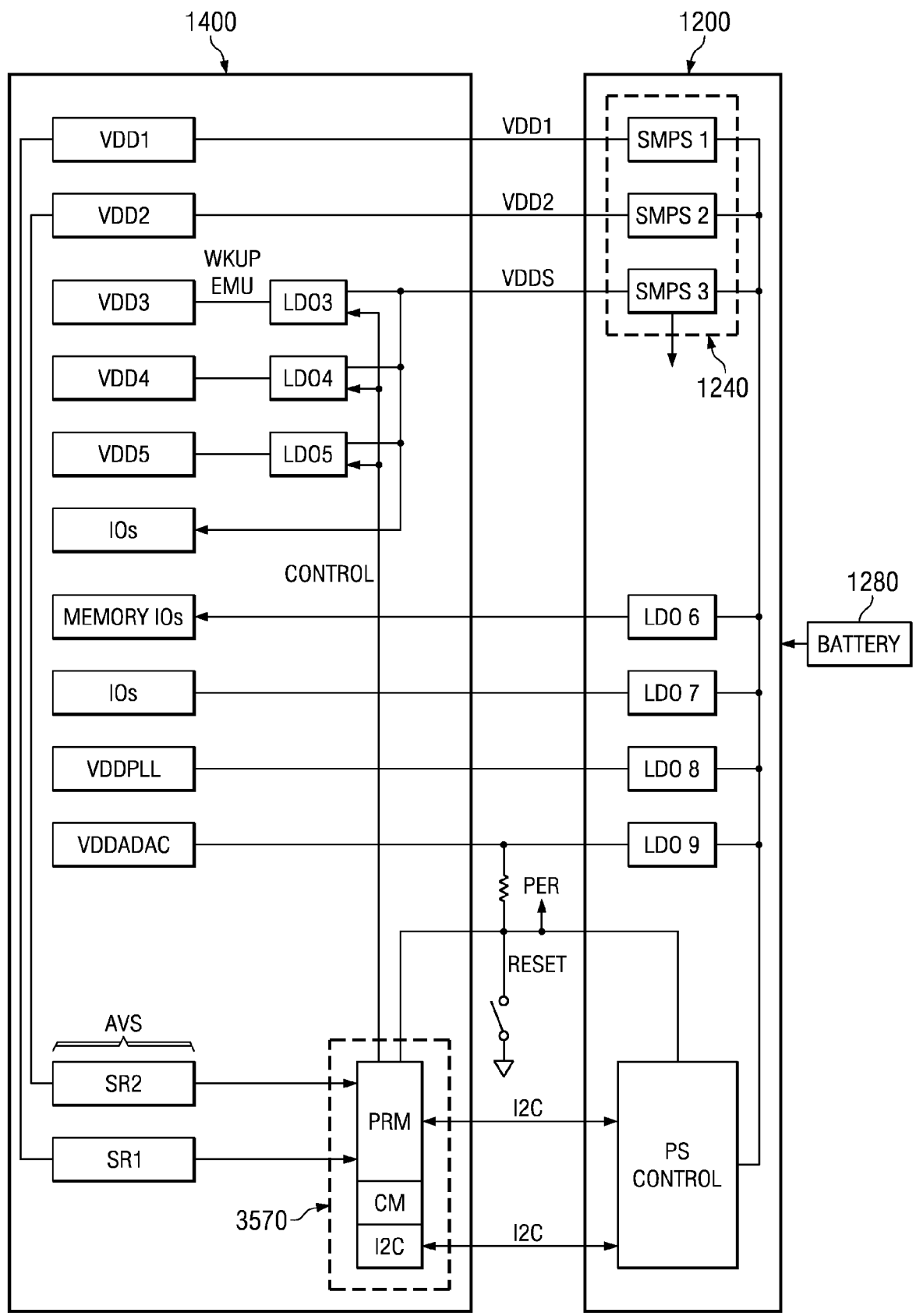
FIG. 2 is a block diagram of an integrated circuit combination of an applications processor and a power IC (integrated circuit) for FIGS. 1 and 23.
Figure 11:
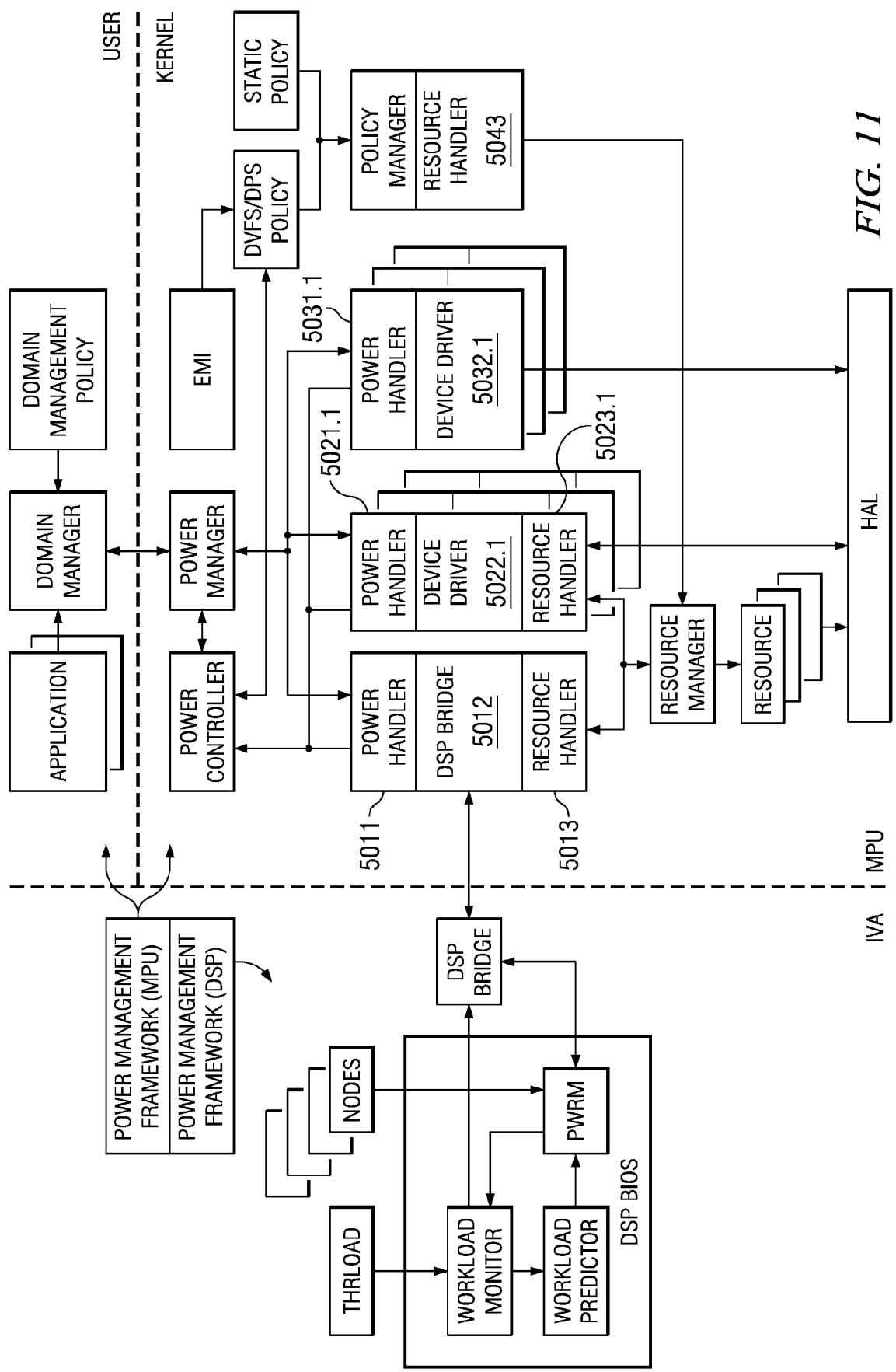
FIG. 11 is a block diagram of power management related software for both an image, video, and audio (IVA) digital signal processor (DSP) and a microprocessor unit (MPU) such as in FIGS. 1 and 3, and simplified as taught therein.

In FIG. 2, an application processor block 1400 uses software control of FIG. 11 and a serial I2C interface, coupled to PRCM (Power Resets and Control Manager) section PRM, to program external power IC 1200. Software can use the I2C interface to program operational VDD1/VDD2 voltage values for Dynamic Voltage and Frequency Scaling DVFS. DVFS establishes an Operating Performance Point or voltage, frequency pair (V,F) for a circuit such as a processor or a bus or a peripheral. The controls carried by the I2C interface permit and In FIGS. 2-3, an embedded Low DropOut regulator LDO3 supplies voltage for both Wake-Up domain and Emulation domain. This LDO3 is continually active feeding the Wakeup domain that includes PRCM 3570. PRM controls power of the Emulation domain and closes a switch in LDO3 upon software request when a debug session starts, or automatically upon JTAG plug detection. LDO4 and LDO5 supply regulated voltage (VDD4 or VDD5) to memory banks such as SRAM. LDO3, LDO4 and LDO5 each have three reference voltages—a normal voltage reference used in device active mode, a VDD1 overdrive voltage reference used when emulation is activated and MPU emulation trace is required, and a third voltage set when the device is in low power mode (OFF mode), in order to optimize leakage power savings. All these modes are automatically managed by hardware. PRM reduces Wake-up LDO3 voltage VDD3 when the device enters OFF mode (Wake-up domain leakage reduction). PRM increases Wake-up LDO3 voltage when emulation is active to support high performance tracing, enables active isolation of level shifters LS during VDD1 and VDD2 removal, and makes a sleep mode active in analog cells when the device enters OFF mode.

Figure 3:
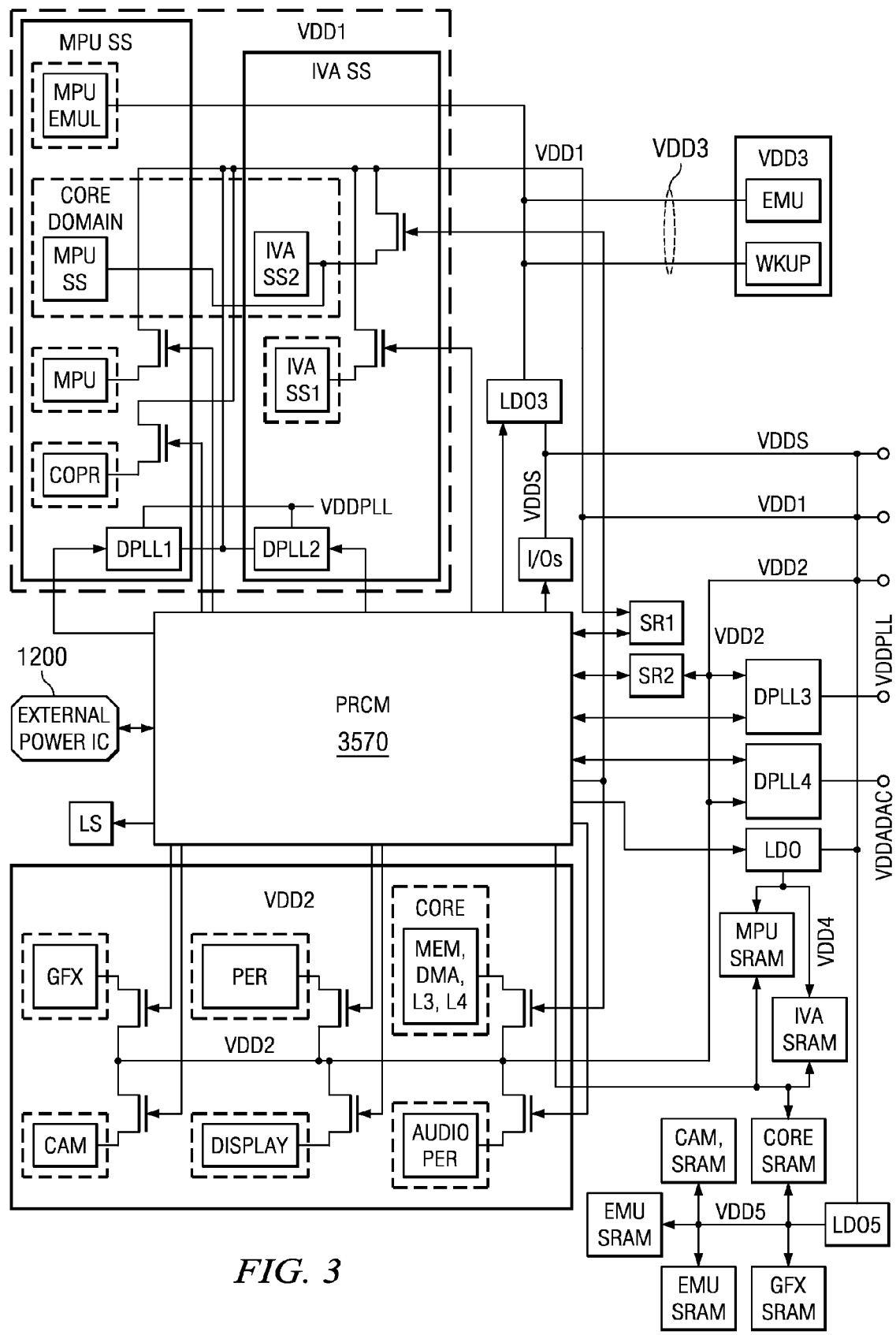
FIG. 3 is a partially schematic, partially block diagram of an integrated circuit for use in FIGS. 1, 2, 4, 22, 23 with voltage domains and power domains.

In FIGS. 2-3, power IC 1200 PS CONTROL governs LDOs 6, 7, 8, 9 that are respectively coupled to applications processor 1400 Memory I/Os, Other I/Os, VDDPLL for DLLs/DPLLs, and VDDADAC for digital/analog converters.

In FIG. 3, PRCM 3570 (1470 in FIG. 23) provides control signals for a PRCM Clock Manager section CM, the signals specifying various configurable and adjustable clock rates to DPLL1, DPLL2, DPLL3, DPLL4 so that they deliver independently controllable clocks to the system. (DPLL herein refers to a Digital Phase Locked Loop, and DLL herein refers to a Delay Lock Loop, either or both of which are suitably applied to the system.) Notice that FIG. 3 illustrates how DPLLs (DLLs) are supplied with voltages. See FIG. 19 for an example of a clock tree including the DPLLs (DLLs) for supplying the various frequencies F to constitute OPPs (V, F).

Types of power modes are Active power modes and the Standby power modes. An Active power mode is any valid combination of domain power states in which one or more power domains are still in a fully powered and functional (active) power state whether some software is still running or not. A Standby power mode is any valid combination of domain power states in which all the domains are either in inactive, retention or off power state.

In FIGS. 2 and 3, power domains are groups of modules on-chip that are independently supplied with power through embedded power switches. A power domain can be a subset of a voltage domain, or a power domain can be functionally split over two or more voltage domains. By turning a power domain switch off and on, power is removed and restored to a power domain without affecting a regulator supplying the voltage domain(s). Large power saving with relatively short wakeup latency results, since switching transitions are faster than regulator voltage ramps. Power domains are physically defined by the power rail that actually supplies the circuitry in a module. Power domains are functionally defined by the signal(s) that actually controls the switch. A single functional power domain can be composed of two physical power domains with their switch control inputs tied or connected together. A physical power domain is a subset of a voltage domain while a functional power domain can be split over two or more voltage domains.

In FIGS. 2 and 3, PRCM 3570 (1470) also delivers respective control signals to turn respective power switch transistors off or on to power various power domains, taking account of any dependencies between them. A VDD 1 voltage domain has plural power domains for each of MPU and IVA. Respective LDOs in power IC 1200 are connected to and supply their voltages to corresponding voltage rails for voltages VDD1 and VDD2 in FIGS. 2-3. A so-called Core domain (MPU core not included) has various power domains with respective power switch transistors that couple in voltage VDD2 under control of PRCM 3570 (1470). In most of the power domain instances, a power domain is supplied by a single power supply as in FIGS. 2 and 3. In one example system, however, the Core power domain includes interconnect 3521 and some other modules as in FIG. 3 and thus is spread over two voltage domains and plural sub-systems. PRCM 3570 (1470) controls various Level Shifters LS. Voltage VDDPLL from power IC 1200 supplies voltage for DPLL1 and DPLL2. The voltages VDD2 and VDDPLL are supplied for DPLL3, and the voltages VDD2 and VDDADAC are supplied for DPLL4.

Figure 20:
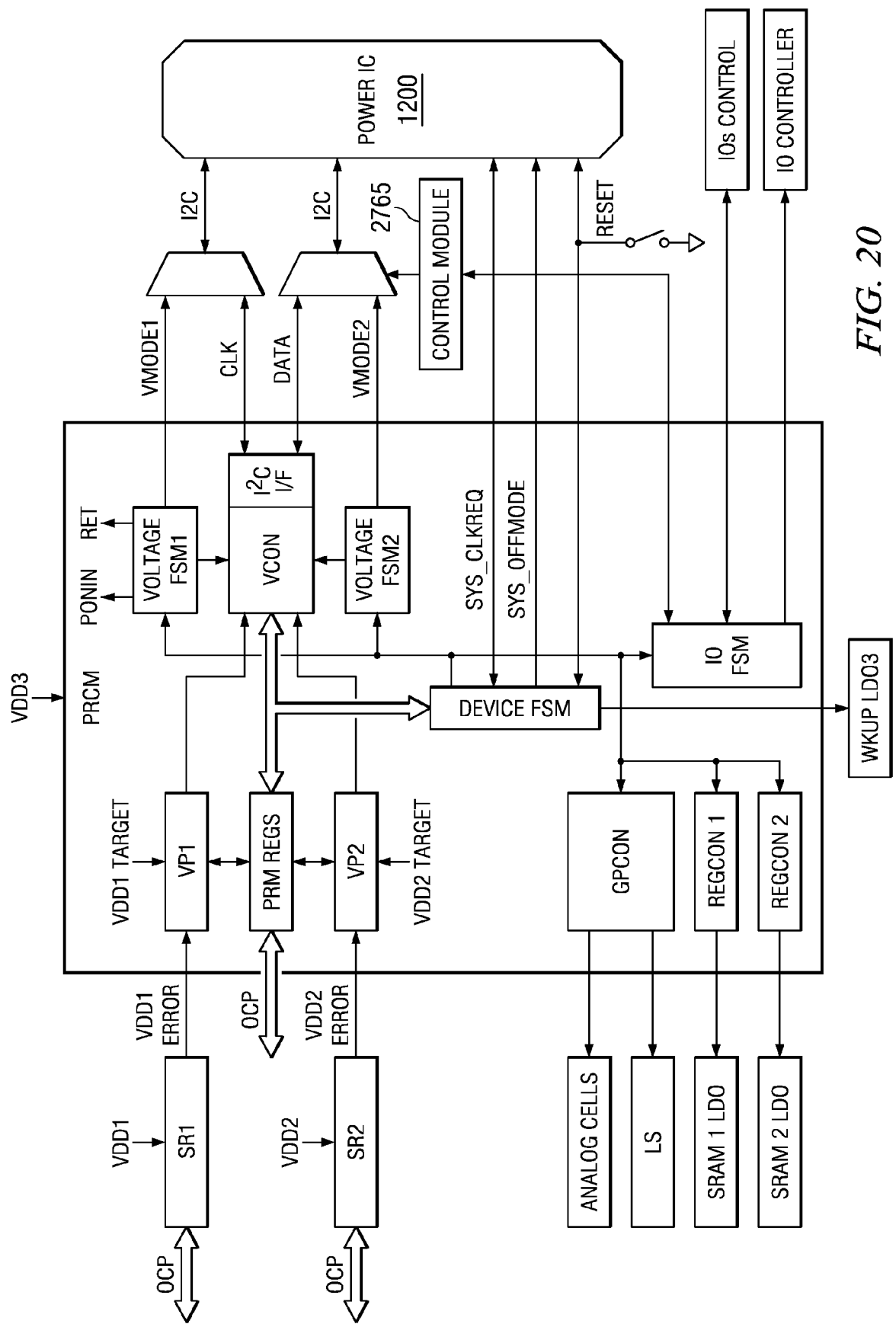
FIG. 20 is a block diagram of adaptive voltage scaling structures and processes for power management in FIGS. 1, 2 and 4.

On chip 1400, a pair of sensor error units SR1 and SR2 for adaptive voltage scaling AVS are respectively supplied with voltages VDD1 and VDD2 and described further in connection with FIG. 20. Sensor error units SR1 and SR2 provide respective sensor error outputs to PRCM 3570 (1470).

In FIGS. 2-3, voltage VDDS is coupled to LDOs which respectively provide voltages VDD3, VDD4, VDD5. A VDD3 voltage domain has power domains for Emulator and Wakeup WKUP. A VDD4 voltage domain has power domains for MPU SRAM and IVA SRAM. A VDD5 voltage domain has power domains for Core SRAM, GFX SRAM, CAM SRAM, EMU SRAM, and other SRAM. (GFX is Graphics Engine, EMU is Emulation circuit.) Voltage switching transistors are provided for the respective power domains in the VDD3, VDD4, and VDD5 voltage domains and are not shown in the drawings for conciseness.

Figure 4:
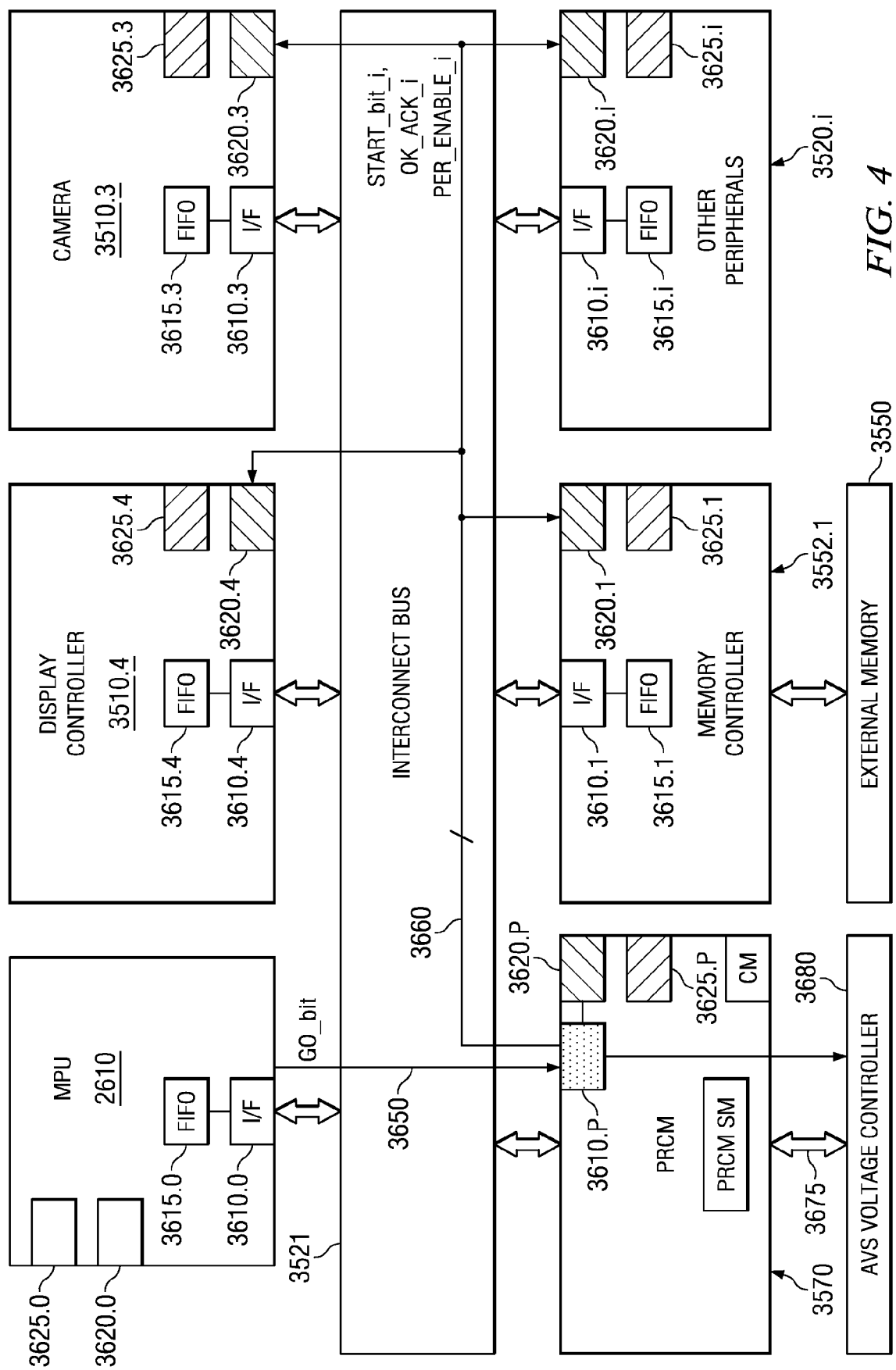
FIG. 4 is a block diagram of the electronic system of FIG. 1 inventively improved for hardware-based supervision, global to the system, of power management transitions for the inventive system.

Description now turns to FIG. 4. Multimedia platforms have a power management methodology in FIG. 10 called DVFS (Dynamic Frequency Voltage Scaling) by which the frequency F and voltage V for microprocessors and for other system blocks in, e.g., FIGS. 1-4 are transitioned from one OPP (frequency/voltage operating performance point) to another OPP.

In FIG. 4, HW control of DVFS as taught herein for low latency power management transitions is compatible with and benefits power management in systems with DVFS, DPS Dynamic Power Switching, AVS Adaptive Voltage Scaling, and SLM Static Leakage Management, described later hereinbelow. Some background regarding power management in systems is in incorporated patent application TI-60478, which is hereby incorporated herein by reference. HW control as taught herein in FIG. 4 and other Figures herein for low latency power management transitions is also compatible with the voltage request arbitration or voting circuitry described in the incorporated patent application TI-60832, which is hereby incorporated herein by reference.

When the DVFS transitions are comprehensively managed by software (SW), the software problematically can involve complex SW code that necessitates high system latency and introduces and occupies one or more long latency intervals during each of those transitions. The systems of FIG. 4 include a microprocessor MPU 2610 and one or more peripherals 3552.1 and 3510.i that are discussed, for example here in regard to a memory controller peripheral 3552.1.

Suppose a DDR SDRAM memory 3550 is coupled to an application microprocessor MPU 2610 with a memory controller 3552.1 in the system. During a DVFS transition involving interconnect bus clock, the whole system is stalled because the memory controller 3552.1 is inaccessible when the source of memory controller clock is interconnect bus 3521 clock itself. Lack of access to the memory controller 3552.1 also prevents dynamic modification of memory controller settings (i.e., parameters). Moreover, memory usage 3550 is sub-optimal as long as the power managed voltage V and frequency F are not at their most efficient (nominal) operating point. If the memory controller settings are thereby not dynamically changeable, the memory usage is then sub-optimal unless the power management is fortuitously at the right operating point OPP already, which is unlikely.

Dynamic modification of the memory controller settings perhaps might somehow be accomplished by SW operating to guarantee that every source of ongoing traffic is stopped in the system. But even if this were feasible, the concomitant latencies are believed to be unacceptable and excessive.

To solve these and other problems, dedicated power management embodiments such as in FIG. 4 and the other Figures are provided to comprehensively manage the power management transition of frequency and/or voltage. Special power management hardware is provided and responds to a simple SW-generated request. The SW-generated request is delivered from MPU to the power management hardware on a line 3650 and is called a Go-bit or Go command. The power management hardware needs no extensive management by complex software code. New settings, parameters or configuration for the memory controller 3552.1, and other peripherals 3520.i, and DLL/DPLL are provided in advance. The new settings are called shadow settings, or succession pre-settings, and are entered into shadow register fields 3620.*i*. The shadow settings thus obviate the problem of how to dynamically modify peripheral settings. The currently-effective peripheral parameter settings that are pertinent to the power management transition are not disturbed by the shadow settings until the shadow settings become applicable, as described herein.

Then the power management hardware 3570 sends a signal designated START_bit_i on path 3660 to initiate a process that de-couples the memory controller 3552.1 and other peripherals 3510.*i* to avoid or prevent further bus 3521 access. The peripherals respond to PRCM 3570 with a handshake signal OK_ACK_i. Then PRCM 3570 using clock manager CM transitions or changes the bus frequency to the new frequency. During the power management transition interval, and with buffers 3615.*i* of sufficient capacity provided in the peripherals 3552.1 and 3510.*i*, the peripherals continue to run so that system latency is substantially reduced or eliminated. This solves the problem of stalling the system because the system runs on a buffered basis while the interconnect bus 3521 is transitioning on its Core domain frequency F and/or voltage V.

The shadow settings, also called succession pre-settings herein, are established by the hardware pre-programming the peripheral memory controller, voltage controller and DLL (delay lock loop or DPLL digital phase lock loop) frequency with the shadow settings pertinent to the next DVFS OPP, called OPPnew. The shadow settings become effective as currently-effective settings for DLL/DPLL and the voltage controller 3680 when the power management hardware 3570 sends them a signal TRANS to initiate the DVFS transition. A handshake signal DONE is returned. Power management circuit 3570 sends a re-enable signal PER_ENABLE_i on path 3660 to the peripherals after the transition is completed (DONE). Each peripheral responds to the re-enable signal to use the shadow setting in place of the currently-effective setting for the peripheral and re-enables peripheral operation on the bus 3521 with the new settings. These frequency and/or voltage shadow settings are effective as currently-effective settings in the peripherals with the DVFS transition completed. The re-enabling operation involves, e.g., memory traffic between memory and the peripheral, and/or between the processor and peripheral(s) or otherwise, which speedily equilibrates the information as between the buffers in the system.

The term "shadow" involves separately pre-setting a successor value while a currently-effective setting in a physically distinct register or register field continues to be effective for a while. Shadowing as taught herein involves more than simply maintaining a copy of a currently-effective setting, such as for diagnostic purposes, as the term shadowing may be sometimes used hitherto. Accordingly, the phrase succession presetting is here and there used along with, or instead of, the word shadowing herein to help emphasize that the shadow value is a new, different value from the currently-effective value at some moment in the operational cycle of the improved power management process.

Originally at system startup, boot code configures the shadow registers 3620.*i* with parameters applicable to PRCM 3570 power management circuitry and peripheral operation at system startup time. The peripherals have register field space(s) 3625.*i* for a currently-effective setting and register field space(s) 3620.*i* for the shadow setting. A power management control state machine or scheduler designated PRCM SM rapidly changes the information in the shadow registers 3620.*i* by pre-programming the new settings, parameters, and configuration that will be applicable upon the next subsequent power management transition to OPPnew.

Alternatively, a codebook or inventory of such settings is pre-programmed into each peripheral at boot time or early run time, and then the processor core or power management circuit sends a short codebook index or shadow activation code. Each target peripheral responds to the codebook index or shadow activation code such by loading the shadow register from the peripheral's own codebook with a given choice of pre-programmed settings, parameters, or configuration held in the particular codebook entry to which the index points. In some embodiments the codebook in the peripheral is provided with a Shadow Activation bit for each codebook entry. The target peripheral responds to the codebook index or shadow activation code by resetting all Shadow Activation bits therein and setting the particular Shadow Activation bit for the particular codebook entry to which the index or shadow activation code points. That particular codebook entry with its Shadow Activation bit in the set-state is the shadow information in this section of the codebook and that portion of the codebook holding the entry constitutes or is regarded as the shadow register itself. Analogously, some embodiments have a Currently-effective Activation bit associated with each codebook. When an entry is advanced from shadow status to currently-effective status, the Currently-Effective Status bits are reset, and that Currently-Effective Status bit is set which corresponds to the particular codebook entry that has its Shadow Activation bit in the set-state, whereupon the just-mentioned Shadow Activation bit is reset (inactive).

Multimedia system embodiments and other electronic system embodiments provided with the power management embodiments permit or confer dramatically reduced latency e.g., on the order of a few microseconds, instead of waiting for up to 16 milliseconds or more, such as for a frame boundary. Power consumption is reduced in SoC (system-on-a-chip) blocks by providing more-fully-optimal DVFS transitions. Because the hardware approach dramatically reduces latency and power, it allows more frequent DVFS transitions without suffering degradation in streaming continuity, external memory latency, and internal system data transfer latency. These issues are important in processing content streams, such as in image signal processing (ISP) for example. The desirable latency reduction is thus accompanied by a beneficial reduction in power. Moreover, such embodiments remarkably not only modify the memory controller and other peripheral settings dynamically but also keep latency desirably reduced.

Figure 22:
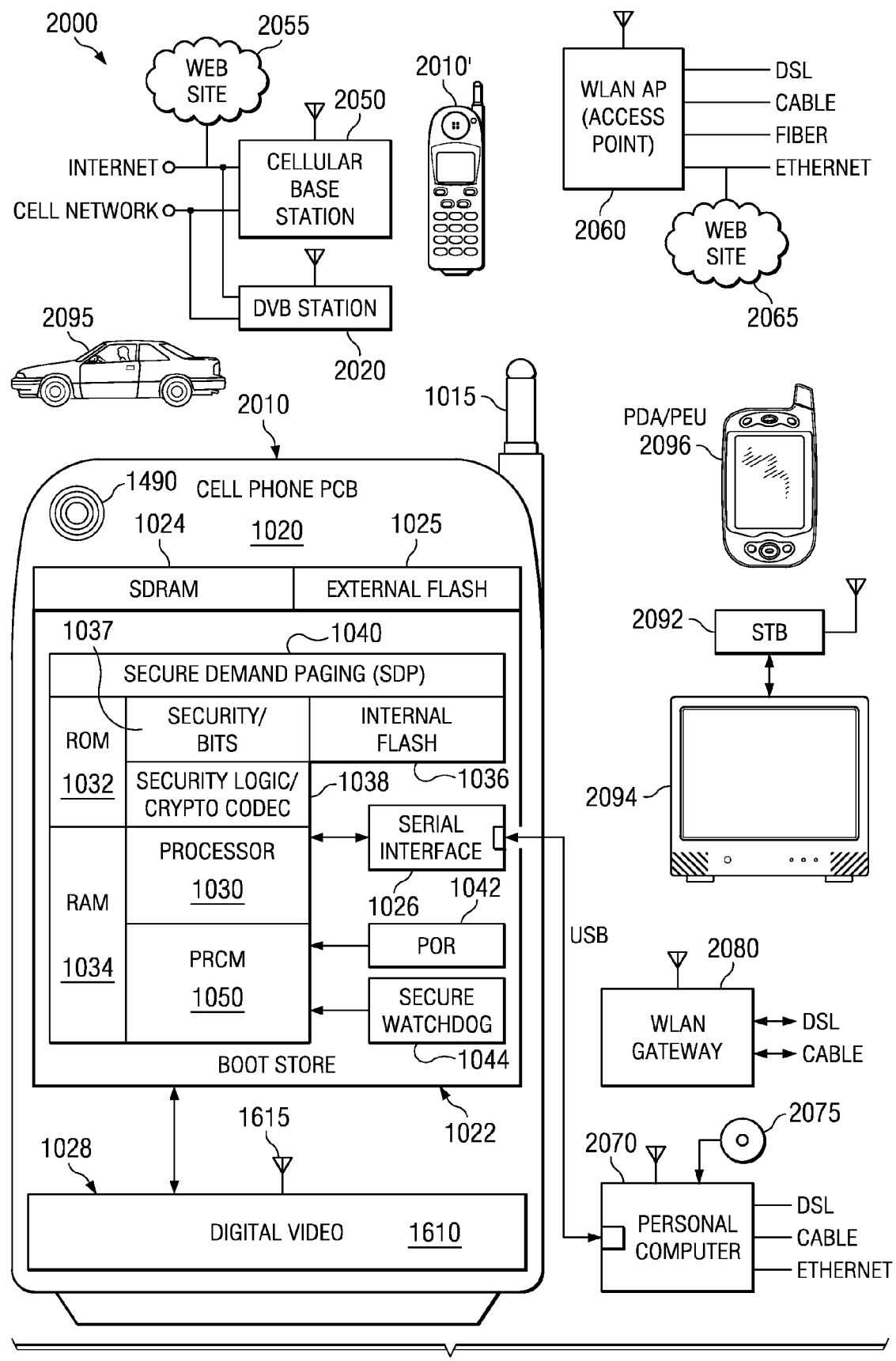
FIG. 22 is a pictorial diagram of a communications system embodiment including system blocks, for example a cellular base station, a DVB video station, a WLAN AP (wireless local area network access point), a WLAN gateway, a personal computer, a set top box and television unit, and two cellular telephone handsets, any one, some or all of the foregoing inventively improved as in the other Figures.
Figure 23:
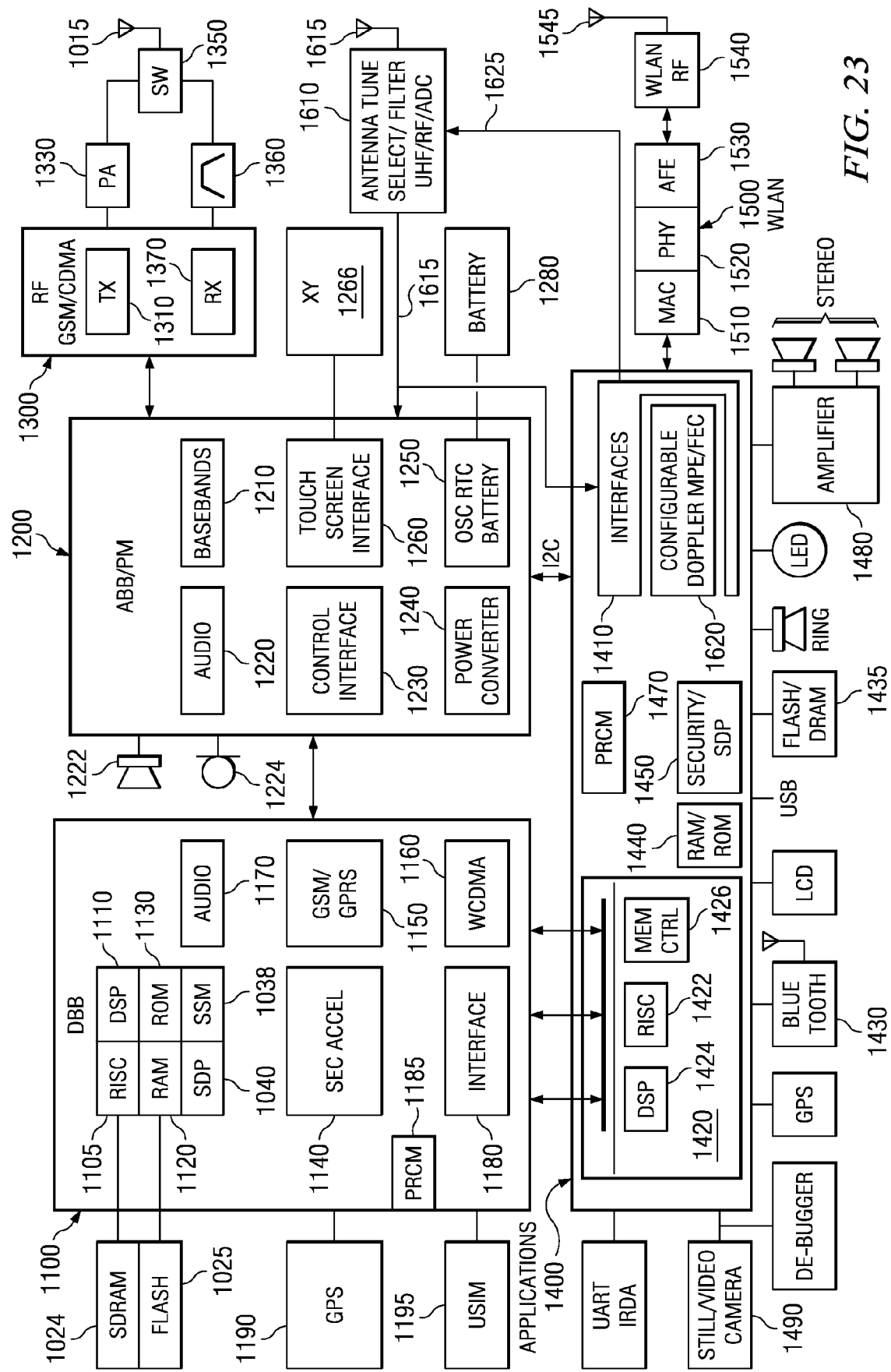
FIG. 23 is a block diagram of integrated circuits for use in the blocks of the communications system of FIG. 22 and including circuits of a cellular telephone handset inventively improved as in the other Figures.

Suppose a video telephone camera (VTC) of FIGS. 1, 22 and 23 uses a high frequency/voltage OPP and substantial power could be saved by transitioning to lower OPP. The latency sensitivity involved in the image signal processing ISP by CAM peripheral 3510.3 and/or IVA in FIG. 1 in the VTC can effectively prevent prior power management from transitioning to the lower OPP, meaning that power and energy are wasted. In other words, a substantial fraction of the power dissipated by the high OPP could potentially be saved going to a lower OPP, but such savings have likely not been possible due to ISP latency sensitivity in a power management approach that has high latency. By contrast, in the hardware embodiments such as in FIG. 4 used to improve the systems of FIGS. 1, 22 and 23 herein to deliver new system embodiments, the ISP latency issue is avoided or a much-reduced ISP system latency is enjoyed. And system power and energy are saved, thereby increasing battery life while maintaining and improving a favorable user experience.

Moreover, providing the power management embodiments herein greatly simplifies the software. SW implementation complexity is considerably reduced or obviated, with benefits of hardware-managing a full or more complete set of OPP transitions more frequently, because 1) complex policies that check every module usage before every power management transition are avoided, 2) software no longer needs to manage the DVFS transition comprehensively, and 3) complicated software interlocks, to determine that an application or use case cannot tolerate more than a predicted amount of latency and then prevent the DVFS transition in such case, either become unnecessary or less significant. Additionally, software development and validation time and expense that would otherwise be involved are eliminated.

In FIG. 4, memory controller 3552.1 has parameter register 3625.1 values such as latency expressed in terms of clock cycles that depend on the clock frequency F. When the clock frequency F is to be changed, the clock cycles of latency for the new clock frequency are pre-programmed into a shadow register 3620.$i$ that is electrically coupled to back up the latency parameter register 3625.1 holding a parameter value related to the current clock frequency F in the memory controller 3552.1.

In other words, the information is pre-programmed, such as by microprocessor MPU 2610 into the shadow register 3620.$i$, but that information is not immediately applied to the parameter register 3625.1 that holds a currently-effective setting for controlling operation of the peripheral 3552.1 or 3510.$i$. Subsequently, a transition initiation signal is sent to the peripheral from the PRCM 3570 scheduling state machine (see any of FIGS. 4, 13, 14, 16, 17, 18) to actually transition peripheral 3510.$i$ operation to the new clock frequency.

When the transition initiation signal is sent, one type of embodiment clocks the contents of each shadow register 3620.$i$ in a given peripheral 3510.$i$ or 3552.1 into the corresponding parameter register 3625.$i$ that the shadow register 3620.$i$ backs up in that peripheral 3510.$i$ or 3552.$i$, or MPU 2610. Each such parameter register 3625.$i$ in the peripheral controls the actual operation of the peripheral in some way, such as controlling the latency of the memory controller 3552.1. Clocking the contents of the shadow register 3620.$i$ into the parameter register 3625.$i$ changes the contents of the parameter register 3625.$i$ and correspondingly changes the actual operation of the peripheral 3510.$i$ or 3552.1 in the applicable way.

Note that in some embodiments a peripheral register circuitry is designed to respond to, or put a new setting into, one register or register field in a fixed role of being the succession pre-setting register field. The peripheral register circuitry is correspondingly designed to respond to, or promote a value into, another one register or register field in a fixed role of being the currently-effective setting register field. Such an embodiment may, at some moments, hold the same value in both the registers after promotion for some time until a subsequent Go-bit event causes the PRCM to cause a new, different value to be entered in the succession pre-setting (shadow) register field for supporting a subsequent power management transition. Upon occurrence of the Go-bit event, the succession pre-setting register field becomes updated with different contents that are different from the contents of the currently-effective setting register field.

Note that in some other embodiments, a pair of registers or register fields may alternate roles such that the peripheral register circuitry is designed to respond to the registers for purposes of one transition as succession pre-setting and the currently-effective setting, then promote the succession pre-setting value simply by responding to its register field as a currently-effective setting, and then on a subsequent Go-bit event the circuitry receives and enters a new, different value into the register field that had previously held the earlier currently-effective setting but then acts in the role of holding a succession pre-setting value, thus alternating the roles.

In some embodiments, the MPU 2610 independently updates a parameter register 3625.0 that controls an interface 3610.0 to which is coupled to a FIFO (First In First Out circuit or queue) 3615.0. In some other embodiments, the MPU is architected in a symmetric manner to peripherals so that a similar pair of registers are suitably provided in the MPU 2610 as MPU shadow register 3620.0 and parameter register 3625.0.

Alternatively, when various possible clock frequencies $F_k$ are available for selection, plural shadow registers 3620.$ik$, or frequency related bit fields k in a single shadow register 3620.$i$ in each peripheral i, are suitably provided in each peripheral 3510.$i$ or 3552.1, or MPU 2610. Each of the plural shadow registers 3620.$ik$, or frequency related bit fields, is preprogrammed with the frequency $F_k$ or with a parameter value $P_k$ associated therewith. A multiplexer circuit (mux) in each particular peripheral 3510.$i$ has respective mux inputs coupled to the plural shadow registers 3620.$ik$ (or frequency related bit fields k). The mux has a mux output coupled to each parameter register 3625.$i$ that is shadowed. PRCM SM sends a transition initiation signal START_bit_i and a frequency selection control signal representing k to couple contents $P_k$ of particular shadow register 3620.$ik$ into the corresponding parameter register 3625.$i$ that the shadow register backs up.

Some embodiments have separate buses from a main processor coupled to different peripherals. For example, a first bus couples the main processor to a memory controller peripheral (e.g., a north bridge chip) coupled to memory, and a second bus couples the main processor to input/output peripherals, imaging peripherals, etc. (e.g., with a south bridge chip) In such embodiments, distinct power management processes each of a type described herein are suitably implemented. One PRCM, or two PRCMs, control(s) a first operating frequency of the first bus and a second operating frequency of the second bus independently and the PRCM communication goes to peripheral register fields and circuitry as taught herein for the various peripherals.

In FIG. 1 and FIG. 4, each of the peripherals 3510.$i$ is provided with respectively sufficient storage capacity in its FIFO 3615.$i$ to handle the stream buffering involved herein during the time interval of a frequency change on the interconnect bus 3521. A peripheral 3510.$i$ is an initiator when it acts as a master or requester for service from another peripheral 3510.$i'$ such as the memory controller 3552.1. For example the memory controller 3552.1 can be a slave for the display peripheral 3510.4 acting as Master or initiator. At the same time, the memory 3550 and memory controller 3552.1 act as the source for a stream of data which is transferred from the memory controller 3552.1 along the interconnect 3521 to the display peripheral 3510.4. Also, the camera peripheral 3510.3 can be a master or initiator relative to the memory controller 3552.1. Camera peripheral 3510.3 generates large amounts of data in the image capture process, which in some embodiments is transferred from the camera peripheral 3510.3 along the interconnect 3521 to the memory controller 3552.1 and the SDRAM memory 3550.

An I/O interface FIFO 3615.1 sized with appropriate capacity (e.g., on the order of kilobytes kB or more in some embodiments and peripherals) is provided in the memory controller 3552.1 and has capacity to store requests for service from a plurality of initiator peripherals 3510.$i$ simultaneously. Also this FIFO 3615.1 supports parallel service by the memory controller 3552.1 to the initiator peripherals 3510.*i*. External memory 3550 is distributed or allocated in memory pages or blocks. Requests directed to the same page or block at about the same time are efficiently serviced by opening the one page, servicing the requests, and then closing that page. In terms of FIFO size, the FIFO 3615.4 is sized to support the display peripheral 3510.4 and its capacity may acceptably be on the order of tens of kilobytes (10 kB). The display controller in the display peripheral 3510.4 uses this FIFO 3615.4 to hold requests, screen refresh, and video data to continually support the display for satisfactory user experience.

An HDTV display controller has a FIFO that may be somewhat larger so that the HDTV display can be continually supported even during a latency (e.g., 5 μs or less) when the frequency is being changed over in the interconnect 3521. When image capture is in progress in camera peripheral 3510.3, support during such a frequency change-over latency interval might call for either local RAM in the camera peripheral 3510.3 or a FIFO appropriately sized. Because the different FIFOs 3615.*i* have different effects on system architecture, real estate and cost, a variety of embodiments here can satisfy different cost and real estate requirements for a given product.

A simple numerical rule of thumb here suggests some of the important benefits conferred by at least some of the embodiments. Let a reference bandwidth be 10 Megapixels/frame times 16 bits/pixel times 60 frames/second. This bandwidth is 9.6 Kbits/microsecond. This means that every 100 nanoseconds (0.1 μs) of latency that can be saved amounts to almost 1 Kbits of FIFO real estate savings. Moving to hardware-based embodiments as taught herein and using shadow registers and automatic shadow promotion circuitry in each peripheral represents an excellent way to provide net savings of FIFO-plus-shadow circuitry real estate. Moreover, the shadow hardware plus FIFOs enables power saving power management transitions that simply would not be feasible in terms of FIFO real estate required under a software-supervised approach, e.g., of FIG. 5.

Figures 5, 6:
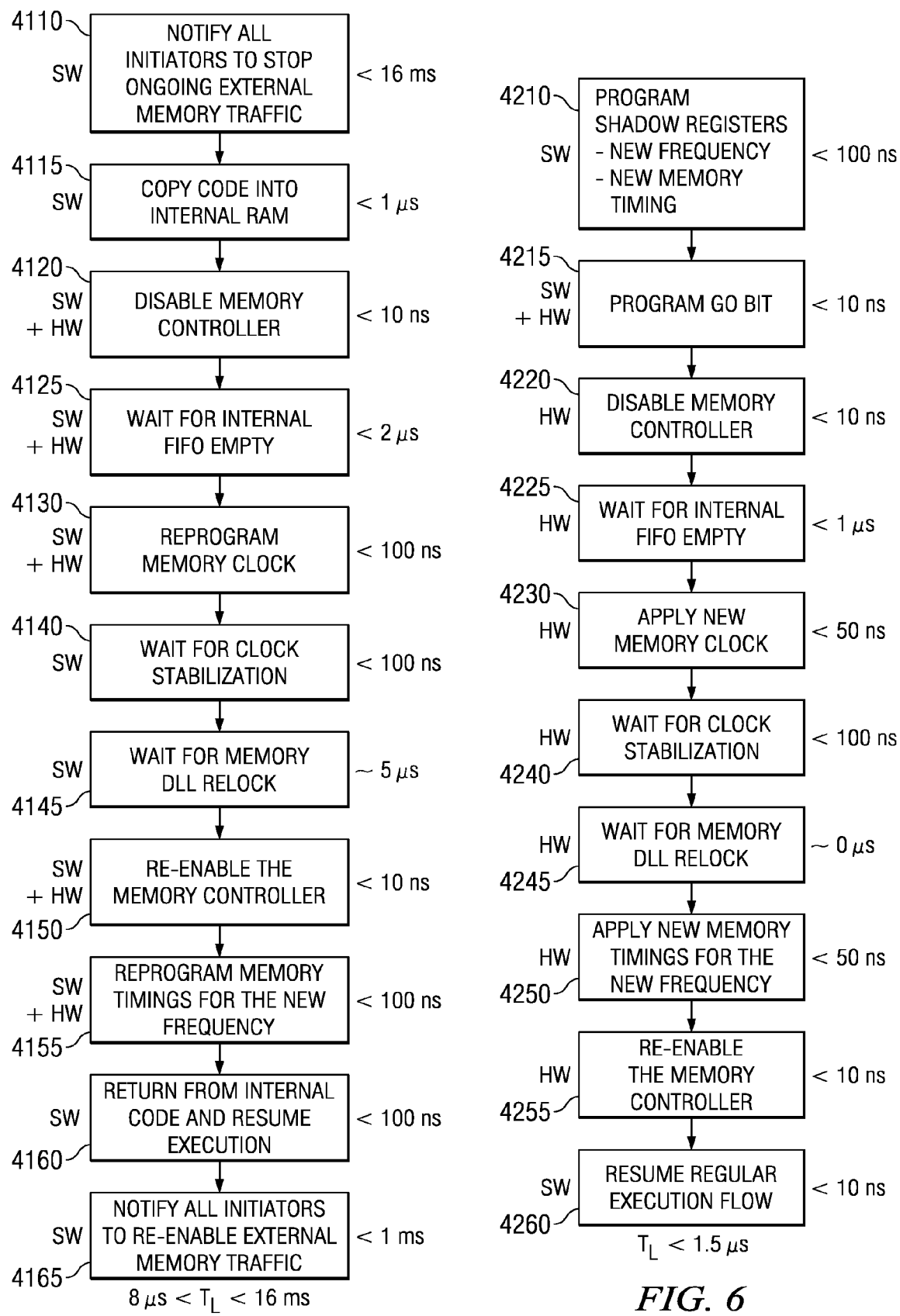
FIG. 5 is a flow diagram of a time consuming process for software control of memory operations and a power management transition.
FIG. 6 is a flow diagram of an inventive process for fast hardware-based frequency transition operations.

In FIGS. 4 and 6 and/or 7-8, a hardware embodiment controls DVFS power management for Core domain (which in some systems refers to interconnect 3521 and may include a peripheral 3510.*i*) and external memory interface EMIF as described next. Shadow registers 3620.*i* in the PRCM 3570 provide controls for setting interconnect clock frequency F (e.g., for L3 interconnect 3521). One register is for interconnect clock frequency update and takes each shadow register value as a current value. A process of operation involves an automatic sequence upon interconnect clock frequency update. The automatic sequence puts the two EMIFs into idle, then promotes shadow register 3620.*i* shadow settings to currently-effective settings and waits for a new interconnect clock frequency F to stabilize, whereupon the sequence puts the two EMIFs back into function. Reset values of timing parameter in EMIF are compatible with BOOT mode. Note that some roughly illustrative time periods are legended on FIGS. 5, 6, 7 and 8 merely for informational indications and comparisons and are not by way of limitation of possible embodiments.

In FIG. 5, a software-controlled process is unassisted by the embodiment of hardware and registers and state machines of FIG. 4. Software (SW) operations in a step 4110 notify all initiators to stop ongoing external memory traffic. Latency conditions must be satisfied, such as waiting up to 16 ms or more for a camera end-of-frame event. Next a step 4115 copies software code into an internal RAM to support this software-based process. Another step 4120 disables the memory controller 3552.1. Then a step 4125 waits for an internal FIFO empty signal from the memory controller indicating to MPU 2610 SW that bus transactions are completed. A further step 4130 reprograms memory clock, and a step 4140 has software wait for clock stabilization, and a step 4145 has software further wait for memory controller DLL relock because software supervises DLL relock. Then software at a step 4150 re-enables the memory controller, and at a step 4155 software reprograms memory timings over the interconnect bus 3521 for the new frequency. In a step 4160 software returns from internal code and resumes application execution. Then software, in a step 4165, notifies all initiators to re-enable external memory traffic, in this software-supervised power management transition. The total latency of the process of FIG. 5 is believed to be unpredictable and too long in duration for use herein.

Instead, different process embodiments called automatic sequences herein are used to comprehensively perform interconnect clock frequency or Core domain voltage changes. One automatic sequence changes the interconnect clock frequency F without voltage change, compare with FIG. 6. Another automatic sequence decreases both the voltage and frequency for the interconnect, compare with FIG. 7 and FIG. 10. An additional automatic sequence increases both the voltage and frequency for the interconnect, compare with FIG. 8 and FIG. 10. A process embodiment of FIG. 6 changes interconnect clock frequency F without voltage change. (To include voltage change, processes of FIGS. 7 and/or 8 are combined with the process of FIG. 6.)

FIG. 6 depicts a hardware-based process embodiment that much more rapidly performs power management transition than in FIG. 5. Legended time periods are illustrative and not by way of limitation of possible embodiments. Software-related steps 4110 and 4115 of FIG. 5 are eliminated. Instead, in FIG. 6, a step 4210 swiftly programs shadow registers 3620.*i* with a new frequency and new memory timing. Then at a step 4215, software at MPU 2610 issues the Go-bit in a brief interval on the order of nanoseconds. A very rapid sequence of operations ensues, wherein the special hardware in FIG. 4 sends a decoupling request to disable the bus interface 3610.1 of memory controller 3552.1 in a step 4220, hardware waits less than a microsecond for internal FIFO to empty at a step 4225, and hardware applies a new memory clock at step 4230. Clock stabilization at a step 4240 occurs in tens of nanoseconds, and memory DLL relocks at a step 4245. Notice in FIG. 6 that DLL relock of step 4245 is a fast hardware-based step that substantially reduces time-consuming software supervision process 4145 of FIG. 5 waiting for DLL relock.

Peripheral hardware applies new memory timings for the new frequency in a step 4250 by promoting the shadow values to currently-effective parameters. Hardware re-enables the memory controller in a step 4255, whereupon the transition process is completed. Software resumes regular execution flow at a step 4260. In FIG. 6, software notification step 4165 of FIG. 5 is eliminated. Notice further in FIG. 6 that the memory timings by shadow register promotion in step 4250 desirably occur internally in the memory controller before re-enabling the memory controller at step 4255. Corresponding promotion occurs in the other peripherals 3510.*i*. By contrast, in FIG. 5 a step 4155 has software and hardware tediously reprogram memory timings for the new frequency over the bus into the parameter registers without benefit of the shadow registers and after step 4150, to reenable the memory controller. The total latency in FIG. 6 in some embodiments is in a range less than five (5) microseconds, and some embodiments are in a range less than 1.5 microseconds, although some other embodiments can provide effective operation outside such range. The total latency is predictable and short.

In FIG. 6, at step 4210 improved SW (FIG. 11) writes new interconnect clock settings in shadow registers 3620.i for those clock settings. SW writes new external memory interface (EMIF) timing parameters in shadow registers 3620.i for the EMIF timing parameters. SW writes to an interconnect clock frequency update register. Then the PRCM 3570 requests an idle to EMIF. EMIF requests disconnection of two slave ports associated with EMIF. Or EMIF stops accepting requests at its transaction boundary and completes all outstanding requests in a step 4225. Then EMIF acknowledges back to PRCM 3570 the idle request of PRCM 3570. PRCM 3570 takes the interconnect clock frequency shadow register values as current values. In a step 4245, PRCM 3570 waits for stabilization of interconnect frequency according to the new settings. When stabilization has occurred, PRCM 3570 requests EMIF to exit Idle. Then in a step 4250, EMIF takes the timing parameter shadow register values as current values. EMIF waits for DLL relock. EMIF acknowledges that EMIF is now functional, and requests for EMIF accesses to SDRAM are serviced again at step 4260. SW execution can even be stalled during the frequency change without harm as the important hardware sequence is performed without SW intervention.

In FIG. 7, voltage V and frequency F are decreased. Legended time periods are illustrative and not by way of limitation of possible embodiments. The automatic sequence first commences and performs a sequence 4420-4450 for changing the interconnect clock frequency F analogous to that of FIG. 6 steps 4220-4255. Next, the automatic sequence commences and completes a voltage scale down sequence 4455-4465 as follows. Adaptive voltage scaling AVS (e.g., SmartReflex™ voltage scaling) is disabled for Core domain (e.g., interconnect) voltage. VDD_CORE voltage setting is updated to new non-corrected value (for weak silicon) such as by shadow register promotion. Adaptive voltage scaling circuit of FIGS. 4 and 20 establishes the corresponding OPP involving decreased voltage. The adaptive voltage scaling circuit is re-enabled for scaling the Core domain (e.g., interconnect) voltage.

FIG. 7 depicts this hardware-based process embodiment that much more rapidly performs power management transition to decrease both voltage V and frequency F. Again, step 4110 of FIG. 5 is eliminated. Instead, in FIG. 7, operations of a step 4410 program shadow registers 3620.i with a new lower frequency F and new memory timing, and new OPP lower voltage V. Then at a step 4415, software at MPU 2610 issues the Go-bit in a brief interval on the order of nanoseconds. A very rapid sequence of operations ensues, wherein the special hardware in FIG. 4 sends a decouple/disable request to the memory controller 3552.1 in a step 4420, hardware waits less than a microsecond for internal FIFO to empty at a step 4425, and hardware applies a new memory clock at step 4430. Clock stabilization at a step 4435 occurs in tens of nanoseconds, and memory DLL relocks at a step 4440. Peripheral hardware applies new memory timings for the new frequency in a step 4445 by promoting the shadow values to currently-effective parameters. Hardware re-enables the memory controller in a step 4450. The transition process proceeds to disable AVS (adaptive voltage scaling) at a step 4455, and change the DVFS voltage V to a lower voltage value at a voltage controller (FIG. 20) in a step 4460. Then AVS is enabled in a step 4465, and the transition process is completed. Notice that the voltage lowering sequence 4455-4465 in FIG. 7 occurs after the frequency lowering sequence 4420-4450. Software resumes regular execution flow at a step 4470.

Indeed, regular SW execution flow 4470 in some embodiments is resumed as soon as step 4450 re-enables the memory controller, e.g., at step 4455 to optimize software performance even further. SW execution can occur during voltage scale-down and there also no need to wait for AVS completion. The total latency in FIG. 7 embodiments is desirably reduced and more predictable compared to that of FIG. 5.

In FIG. 8, voltage V and frequency F are increased. Legended time periods are illustrative and not by way of limitation of possible embodiments. The automatic sequence first commences and completes a voltage scale up sequence 4520-4530 as follows. Adaptive voltage scaling AVS (e.g., SmartReflex™ voltage scaling) for Core domain voltage is disabled. VDD_CORE voltage setting is updated to new increased non-corrected value (for weak silicon). Adaptive voltage scaling circuit of FIGS. 4 and 20 is updated for the corresponding OPP involving increased voltage. Adaptive voltage scaling circuit is re-enabled for scaling the Core domain voltage. Next, the automatic sequence 4535-4570 of FIG. 8 commences and completes a sequence analogous to steps 4420-4450 of FIG. 7 and steps 4220-4255 of FIG. 6 for changing the interconnect clock frequency F by increasing that frequency in FIG. 8.

FIG. 8 depicts this hardware-based process embodiment that much more rapidly performs power management transition to increase both voltage V and frequency F. Again, step 4110 of FIG. 5 is eliminated. Instead, in FIG. 8, operations of a step 4510 program shadow registers 3620.i with a new higher frequency F and new memory timing, and new OPP higher voltage V. Then at a step 4515, software at MPU 2610 issues the Go-bit in a brief interval on the order of nanoseconds. A very rapid sequence of operations ensues wherein the special hardware in FIG. 4 disables AVS (adaptive voltage scaling) at a step 4520, and raises the DVFS voltage V in voltage controller (FIG. 20) in a step 4525. Then AVS is enabled in a step 4530. Notice in FIG. 8 that the voltage increase operations 4520-4530 are occurring prior to the frequency increase operations 4535-4570, i.e., earlier in the rapid-fire hardware operational sequence. By contrast, the voltage decrease operations 4455-4465 in FIG. 7 occur subsequent to the frequency decrease operations 4420-4450 in FIG. 7. A successive step 4535 in FIG. 8 disables the memory controller 3552.1, hardware waits less than a microsecond for internal FIFO to empty at a step 4540, and hardware applies a new memory clock at step 4550. Clock stabilization at a step 4555 occurs in tens of nanoseconds, and memory DLL relocks at a step 4560. Peripheral hardware applies new memory timings for the new frequency in a step 4565 by promoting the shadow values to currently-effective parameters. Hardware re-enables the memory controller and other peripherals in a step 4570, and the transition process is completed. Software resumes regular execution flow at a step 4575. AVS is not a blocking step for SW execution. The total latency in FIG. 8 embodiments is much reduced compared to that of FIG. 5.

Figure 9:
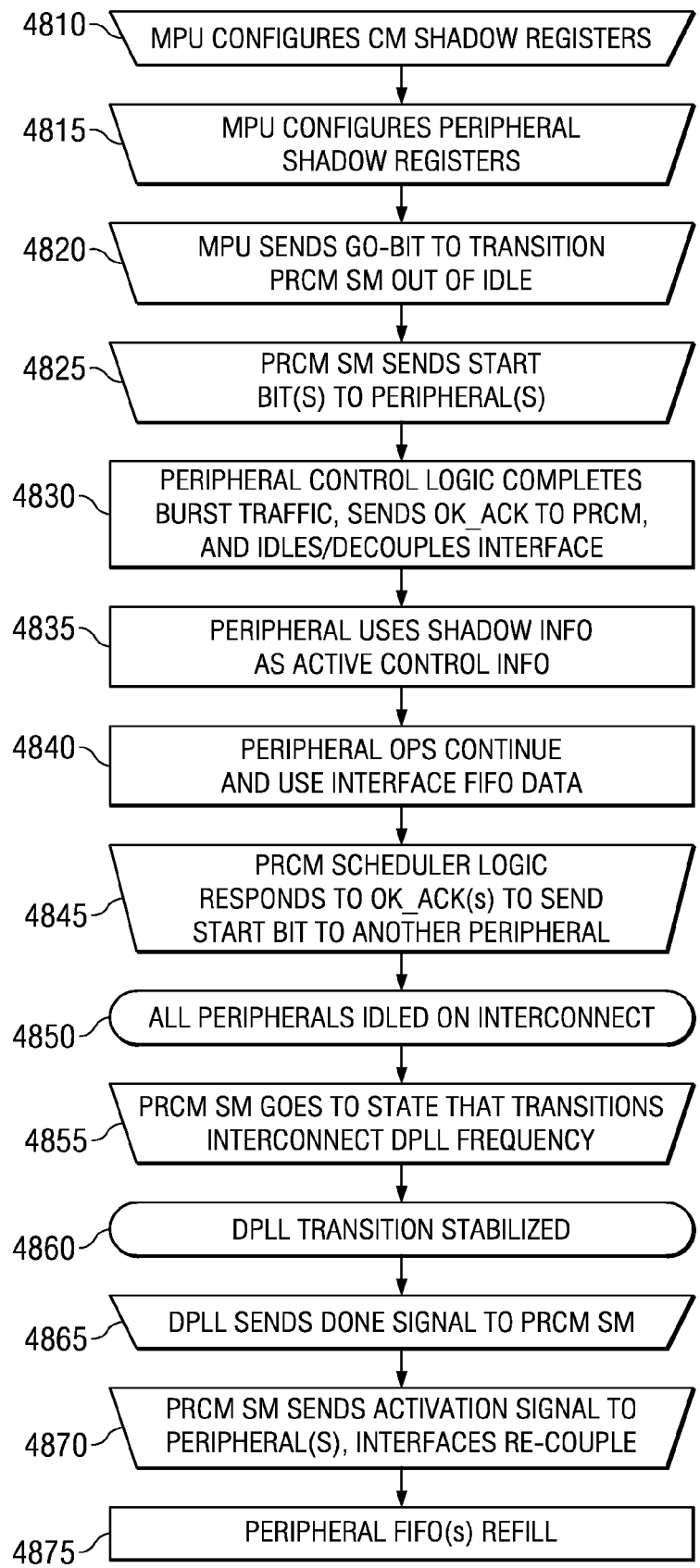
FIG. 9 is a flow diagram of an inventive process for global system power management.

FIG. 9 depicts system operations with emphasis on operations in a given peripheral 3510.i. This process and the various architectural embodiments are used for instance, when the interconnect bus and a memory controller 3552.1 or other peripherals 3510.i are run from the same clock DPLL. In some system embodiments, the MPU 2610 is run from a different DPLL than the DPLL that is used to run the interconnect 3521, and the MPU 2610 is connected to the interconnect bus by an asynchronous interface. The interconnect and one or more of the peripherals 3510.i can run on the same clock or are derived from the same clock by clock division as in FIG. 19 and are conveniently clock controlled with a clock frequency F that is changed by the PRCM 3570.

In a step 4810 the MPU 2610 programs or configures shadow registers 3620.P in the clock manager CM which prepare the clock manager CM for control operations which will only commence in a subsequent step 4820 when the MPU 2610 sends Go_bit. Also, in a step 4815 the MPU 2610 programs shadow registers 3620.i in each peripheral 3510.i. The shadow settings information in the shadow registers 3620.i is used when the power management control state machine PRCM SM (scheduler) sends an initiation command START_bit_i or PER_EN_i to the peripheral 3510.i.

In a step 4820, the MPU 2610 sends the Go bit to the power management control state machine which transitions out of Idle state and commences the control sequence depicted in FIG. 9.

In a FIG. 9 step 4825, the power management control state machine sends a Start bit to a given peripheral 3552.1, 3510.i. Depending on the relationships of peripherals to each other, a sequence of Start bits is sent to peripherals that are to be controlled in sequence. In case of peripherals which have substantial independence of peripheral operations from each other, a plurality of Start bits is simultaneously or concurrently sent to such peripherals.

In a succeeding step 4830, a control logic circuit in a given peripheral 3510.i responds to the Start bit by completing any burst traffic on the interconnect bus 3521 that is in the middle of a burst. Thus the control logic for peripheral handshake OK_ACK_i is qualified by the peripheral reaching a state wherein its interface FIFO 3615.i is sufficiently depleted to support either storage of new data during the upcoming frequency transition, or wherein FIFO 3615.i is sufficiently full of received data from an initiator elsewhere to support sourcing of data for use (e.g., display) by the peripheral during the upcoming frequency transition. Any other preparations for decoupling of peripheral interface 3610.i from the interconnect bus 3521 are executed in any suitable way. In step 4830, the control logic circuit in the given peripheral 3510.i completes its response to the Start bit by returning an OK_ACK acknowledgment to scheduler logic in the power management control state machine PRCM SM.

In a step 4835 the control logic circuit in a given peripheral 3510.i transfers information in the shadow registers 3620.i to the active control registers of the peripheral 3510.i to modify the operation of the peripheral 3510.i in the manner that has been preestablished for the peripheral 3510.i by the MPU 2610 when the MPU 2610 programmed the shadow registers 3620.i. (Alternatively, activation of registers goes from one set of currently active control registers to another set of control registers that have acted as shadow registers 3620.i.) Even though the bus interface 3610.i goes idle in the peripheral, the operations of the peripheral 3510.i continue and use the interface FIFO 3615.i in a step 4840 for storing or supplying data respectively, depending on whether peripheral 3610.i is sourcing or consuming data.

In a step 4845, the PRCM SM logic responds to OK_ACK acknowledgment as a state transition signal to enable the power management control state machine to send a Start bit to any other peripheral 3510.i that is then to be idled. Alternatively, the scheduler logic receives some or all of the OK_ACK acknowledgment signals from a plurality of peripherals 3510.i and responds to them collectively.

In a step 4850, the peripheral interface 3610.i to the interconnect bus 3521 has in the meantime gone idle and become electrically decoupled from interconnect bus 3521.

In a FIG. 9 step 4855, the power management control state machine PRCM SM transitions to a state that directs the frequency transition by the DPLL that controls the clock for the interconnect bus 3521. This frequency transition has a time interval or latency that is recognized and handled in advance as described above by the combination of the power management control state machine PRCM SM in the PRCM 3570 cooperating with the control logic circuits in all the peripherals 3552.1, 3510.i. During the latency, the peripherals that were or became decoupled from the interconnect bus remain decoupled from the interconnect bus. In some embodiments where in the power management control state machine PRCM SM sends the command for Start over the interconnect, then the power management control state machine, even though it directs the interconnect DPLL clock transition process, is decoupled from communicating over the interconnect during this time. The peripherals 3552.1, 3510.i seamlessly maintain the peripheral operations during the latency interval while the frequency of the clock on the interconnect bus is being changed.

In a step 4860, the DPLL clock transition process is completed and stabilized. In a step 4865 a DONE signal from the DPLL is coupled to the PRCM SM. PRCM SM then sends a signal PER_EN_i in step 4870 to each peripheral control logic circuit (e.g., peripheral state machine SM) to enable each peripheral interface 3610.i to again become coupled and available for activity on the interconnect 3521. Alternatively, the signal from the DPLL is coupled directly to the peripheral control logic circuits for this purpose. In a given peripheral 3510.i the FIFO 3615.i, which has become partially depleted during the latency of the DPLL clock transition process, now is refilled at a step 4875 and continues to be maintained by data transfers over the interconnect 3521 in the usual manner now that the DPLL clock transition process has been completed.

Processor engines for battery powered devices such as PDA or smart cell phone have increased requirements in term of feature complexity and performance. To address these requirements advanced power management processes are provided herein, such as any one, some, or all of Dynamic Voltage and Frequency Scaling (DVFS), Dynamic Power Switching (DPS) and Adaptive Voltage Scaling (AVS) as described herein. All these processes have their respective advantages and are often more efficient for a given source of power consumption (active/standby).

In DVFS, supply voltage V is scaled to a lowest adequate voltage sufficient to deliver various operation modes and frequencies currently predicted as needed for processing and system bandwidth at different moments in operation. For each operating point, reduced active power and reduced leakage power are sought. Power savings associated with adjusting the supply voltage are combined with both changes in the performance requirements and AVS (adaptive voltage scaling) to handle changes in environmental variables, such as temperature and wafer fabrication process. Each OPP voltage value is dynamically and optimally selected using DVFS and is respectively scaled by AVS adaptive voltage scaling herein in response to the respective sensors SR1, SR2 in steps of approximately 1% of the voltage delivered. The steps are suitably made a constant incremental voltage value on the order of 0.1% to 5% of the actual voltage delivered at any given OPP.

Dynamic voltage frequency scaling (DVFS), Dynamic Power Switching (DPS), and adaptive voltage scaling (AVS, e.g., SmartReflex™ power management from Texas Instruments Incorporated) are combined in some embodiments to minimize the power consumption of a device in plural, many, most, or all operating modes. Some embodiments, utilizing all three of DVFS, DPS, and AVS achieve greater power reduction than any one of DVFS, DPS, and AVS alone.

The system includes a processor and/or any collection of modules that can be characterized by a performance requirement. The performance is defined, for instance, as a percentage (%) of maximum performance or maximum bandwidth and is translated into a target frequency of operation $f_{target}$. The system is characterized for a given number of OPPn (operating performance point), each indexed by a value of an index n. Each OPPn corresponds to a pair (Fn, Vn) representing its frequency Fn and supply voltage Vn.

When DPS is started, a given domain is switched dynamically between its Active state and a low power state (OFF, Retention, inactive). In some embodiments of DPS herein, supply voltage V is scaled to a) a lowest adequate DVFS voltage in operation and b) a substantially lower leakage-reducing voltage or to zero in deep-sleep. Adaptive voltage scaling (AVS) is used to adjust and set an actual minimum appropriate voltage in the vicinity of a voltage Vn defined by DVFS for a current OPPn.

Dynamic Power Switching (DPS) improves active time. Based on to the hardware resources activity, as indicated by FIFO buffer status, for instance, DPS switches the device dynamically from any of several medium power modes to a lower power mode during application execution or to a low power Standby mode. DPS predicts system load and switches the module clocks dynamically between On and Off modes. DPS switches one or more power domains dynamically between On and Retention, or between On and Off. DPS provides automatic hardware detection of conditions (e.g. FIFO fill status or IO hardware signals) for sleep and wakeup transition for clock and power. DPS performs hardware management of sleep and wakeup dependency between the power domain, and hardware handshaking with modules.

DPS is a power-management technique, like DVFS that can reduce active power consumption by the device. Whereas DVFS reduces both dynamic and leakage power consumption, DPS reduces leakage power consumption at the cost of a slight overhead in dynamic power consumption and temporarily shuts down one or more parts of the system. With DPS, the system switches dynamically between high and low consumption system power modes during system active time. When DPS is applied, a processor or a system runs at a given DVFS OPP (full OPP frequency Fn) even when the OPP frequency exceeds a target performance frequency $f_{target}$. DPS thus combined with DVFS operates to complete tasks as fast as possible, given a currently established DVFS OPP, followed by an automatic switch to a low-power mode, for minimum leakage power consumption. DPS is also useful, for example, in situations herein where a real-time application is waiting for an event. The system can switch into a low-power system mode if the wake-up latency conditions allow it. This technique involves maximizing the idle period of the system to reduce its power consumption.

When combining DVFS and DPS, the operating frequency is not scaled to exactly match the minimum performance requirement $f_{target}$. Unless DPS cannot be applied for other reasons, then for a given operating point OPP of DVFS the operating frequency is set to the OPP frequency Fn that is the maximum frequency allowed at a given voltage Vn for that OPP. This facilitates optimal process completion time and application of DPS.

Scaling the frequency while keeping the voltage constant reduces peak power consumption. See FIG. 6 for an improved approach that can have a positive effect on temperature, dissipation and on battery life. In other situations where no applications are running and the performance requirement becomes negligible or drops to zero, SLM is suitably used.

SLM switches the device into ultra-low power modes when no applications are running. SLM switches the module clocks between On and Off and switches one or more power domains between On and Off. SLM lowers the voltage substantially or shuts down applicable external and/or internal voltage regulators. SLM reduces standby power consumption, or leakage power consumption. Applying SLM puts the system into an ultra-low power mode called Off mode having very low total chip current and wherein the Wakeup domain on the chip can still be activated. The wakeup clock (e.g., 32 kHz) remains on and a wakeup power voltage remains applied to the Wakeup domain. A system and security timer and watchdog timer 1044 of FIG. 22 are functional and can wake up the device. Also, a level transition can be detected, logged from any pad and thereby wakeup the device. Also, a small backup memory is retained in the Off mode. Thus, the SLM circuit still wakes up autonomously from Off mode in response to a timer interrupt or detection of any pad transition. SLM trades off static power consumption and wakeup latency (time interval consumed by a wakeup process). For SLM, domain state transitions are controlled in sequence according to their sleep and wakeup dependencies.

When a given task is started, DPS is applicable to it. The DPS transitions are related to system performance requirements or processor load. DPS transition latency is generally small compared to applications time constraints or deadlines so that DPS does not degrade application performance. For DPS, transitions latencies can be in a range of one (1) microsecond to one hundred (100) microseconds, for instance, and latencies outside this illustrative range are also usable. DPS is supported by performance prediction implemented, in some embodiments herein, by substantially simplified software of FIG. 11 and comprehensive power management control hardware.

DPS and SLM can differ by the type of wakeup event that triggers wakeup transitions. For DPS, wakeup events are application related (timer, DMA request, FIFO fill signal, peripheral interrupt, key pressed). In case of SLM, wakeup events are more user related, such as from touch screen, key-press, peripheral connections, etc., and SLM latencies are likely to lie in a range of one millisecond (1 ms) to ten milliseconds (10 ms) depending of available device mode, and SLM is feasible for longer or shorter latencies as well.

Active power consumption refers to the power consumption of the system during the active time, namely when some processing is on-going. The active power consumption is composed of dynamic power consumption (transistor switching) and leakage power consumption. Standby power consumption refers to the power consumption of the system during standby time, namely when no processing (or very limited processing) is ongoing and the system is waiting for a wakeup event. The standby current consumption is composed mostly of leakage consumption and very limited amount of dynamic power consumption. DVFS substantially minimizes the idle time of the system. DVFS saves active power consumption, where power consumption is proportional to the multiplicative product $CV^2F$ of capacitance C, square of voltage V, and clock rate or frequency F, compare FIG. 10. Cutting frequency and running the application process longer may cancel out in a DVFS power managed processor energy consumption calculation, leaving the net benefit of the voltage-squared factor to reduce net energy consumption (power times time equals energy).

Figure 19:
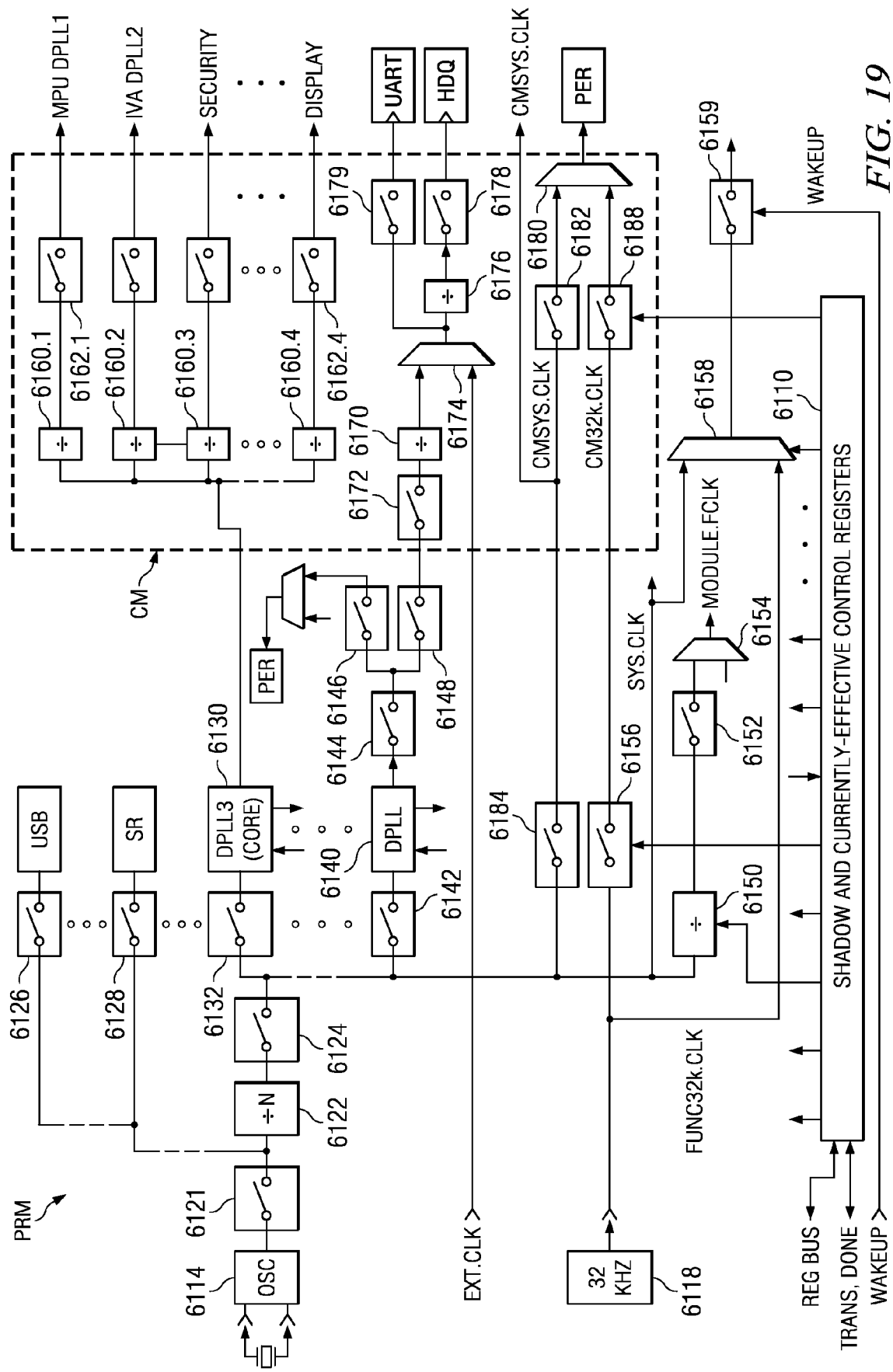
FIG. 19 is partially schematic, partially block diagram of a power management clock management unit (CM) for a PRCM in FIGS. 1-4.

In FIG. 3, programmable DPLLs are provided in an example and allow fully independent DVFS/AVS scaling of microprocessor MPU frequency and IVA (imaging, video and audio) processor frequency and Core domain interconnect frequency. A selection of clock dividers on the DPLL output in FIG. 19 provide a wide range of clock rate division ratios and support dynamic frequency scaling without incurring DPLL re-lock time. One or more asynchronous interfaces ASYNC of FIG. 1 are provided to couple the processors MPU and IVA to the Core domain interconnect bus 3521 such that the frequency of the processors MPU and IVA can be set freely and scaled while keeping interconnect bus and memory interfaces at another frequency determined for them. This avoids software overhead of re-configuring a memory interface when MPU and/or IVA processor frequency is changed by DVFS/AVS.

Figure 10:
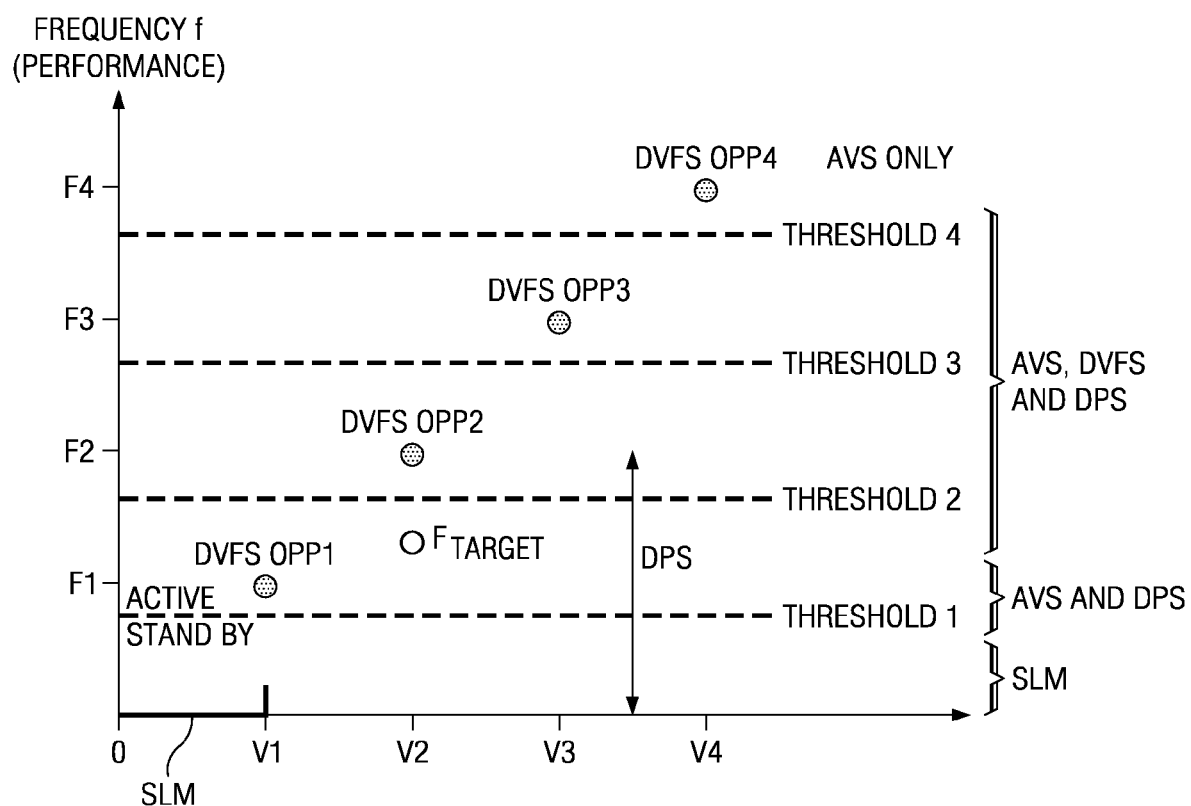
FIG. 10 is a graph of frequency versus voltage and showing Operating Performance

In FIG. 10, four Operating/Performance Points (OPPs) are tailored to an MPU domain and an analogous set of four OPPs to an IVA domain. In one embodiment of FIG. 3, the MPU and IVA have the same voltage VDD1 and can be operated at different frequencies using the respective DPLL1 and DPLL2 for them. In another embodiment, independent different voltages are provided for each of MPU and IVA as well. Another two DVFS OPPs are provided for voltage VDD2 to the Core domain in one example. The voltage domains are decoupled so that, for example, high bandwidth autonomous DMA transactions are run off a higher voltage VDD2 while the low frequency MPU can be run off a lower voltage VDD1 to optimize SoC power. The processor cores are designed with multiple discrete OPPs such as at 125%, 100%, 50%, and 25% of a nominal design frequency, and application OPPs are software programmable to a coarser or finer resolution. Some fixed function peripherals (e.g. MMC/SD interface) are synthesized to allow operation across OPPs, while others, (e.g. Mobile DDR SDRAM) are scaled in clock frequency at lower OPPs. A wakeup domain WKUP has an operating voltage VDD3 and a sleep voltage that is lower than the operating voltage. MPU and IVA caches are supplied with a voltage VDD4 in a manner that generally tracks the voltage VDD1 provided to the processor logic.

In FIG. 10, DVFS has a frequency scaling step wherein clock frequency is changed by re-configuring control register(s) to reach the frequency corresponding to the selected OPP. The configuration sets new values for clock divider or sets new M, N multiply, divide values for the DPLL. DVFS voltage scaling software or hardware configures a new count value in the AVS sensor module SR1 and/or SR2 corresponding to the selected OPPn.

In FIG. 10, power managed clock frequency F, which affects application performance, is graphed versus power managed voltage V. On standby, the voltage is kept low or zero and the frequency is zero. A horizontal line SLM in the frequency-voltage region represents that Standby Leakage Management (SLM) is employed.

For low performance applications, a low voltage V1 is established and the frequency is established at frequency F1, represented by operating performance point OPP1 in FIG. 10, by power management processes. As more applications and/or applications performance are required, beyond the maximum performance available at OPP1, then DVFS power management makes a discrete transition of operating voltage from voltage V1 to voltage V2 and increases the frequency from F1 to F2. As even more applications and applications performance are required, beyond the maximum performance available at OPP2, then DVFS power management makes a discrete transition of operating voltage from voltage V2 to voltage V3 and increases the frequency from F2 to F3, and so forth. At each OPP point, AVS power management manages the voltage depending on the parameters of the integrated circuit. DPS power management is activated if the target frequency $F_{target}$ for a given process is below a threshold frequency THRESHOLD 1, 2, 3, 4 so that DPS energy savings are sufficient to justify activating DPS at the given $OPP_n$. For example, in FIG. 10 the currently-selected DVFS OPP is OPP2, target frequency $F_{target}$ is sufficiently below the frequency of OPP2 to be lower than THRESHOLD2, and DPS activation is justified.

The process operates in reverse as fewer applications and/or less applications performance are required. When performance needed can be managed at a lower OPP, then power management process DVFS makes a discrete transition of operating voltage downward by one voltage step to reach the next lower operating point $OPP_{n-1}$.

Integrated circuit voltage domain and power domain partitioning enables very efficient DPS for audio play back and screen refresh, which are subject to leakage power dissipation. During screen refresh or audio playback, the rest of the integrated circuit remains most of the time in an Off or Retention low leakage mode wherein only the display domain is On or audio playback circuit is on. The screen or audio circuit is refreshed from its respective internal FIFO which is sized sufficiently large (e.g. in range 1 Kbytes to 10 Kbytes or larger) to feed the screen or audio circuit independently of the rest of the integrated circuit and thus permit most of the integrated circuit to be in low leakage mode. When that internal FIFO needs to be refilled, a FIFO-fill signal is generated from the internal FIFO and is fed to and automatically wakes up the Core domain.

FIFO 3615.$i$ size for operations in FIGS. 4-8 here is beneficially coordinated with power management by DVFS and DPS in some embodiments. The display controller 3510.4, for example, refreshes the screen from its internal FIFO 3615.4 while the Core domain is in retention. The frame buffer in SDRAM 3550 may be inaccessible in low power screen refresh mode. During the frequency scaling step of DVFS, the External Memory Interface EMIF with SDRAM Refresh Controller 3552.1 is momentarily not accessible from bus 3521 for a time interval having a duration on the order of microseconds. Therefore, the display FIFO 3615.4 is made large enough to absorb this time interval when the frame buffer is not accessible. The FIFO size is made large enough to cover this period while the Core domain is in retention and also during the Retention to ON and ON to Retention transition time. Increasing the length of time the Core domain can stay in retention increases the power saving and the efficiency of DPS.

Analogous to the display FIFO, an audio process has a larger audio buffer size (e.g. in McBSP™ multi-channel buffered serial port interface to an external audio codec) that increases the efficiency of the DPS strategy for audio low power use case. The longer the integrated circuit 1400 is in Data Send Out power mode the larger the power saving by DPS.

A formula for estimating a buffer size S for audio is given by $S=2\ W\ f_t\ T_t$, where W is bus width (e.g. 32 bits), $f_t$ is transfer rate (e.g. 48 KHz for audio), and $T_t$ is transfer time, and the factor 2 is a Nyquist sampling factor. One buffer size rule of thumb herein accordingly calls for about 3.2 Kbits per buffered-millisecond of streaming audio. Buffer size depends on application as for audio, camera, display and other applications, and on the latency to be buffered. Buffers 3615.$i$ on the order of e.g., kilobytes capacity are suitably operated according to the hardware-based power management processes taught herein. Such buffers on the order of kilobytes capacity handle power managed transitions of an interconnect 3521 voltage and frequency as in any of FIGS. 6-8 while a streaming audio application is running. Also, such buffers on the order of kilobytes capacity handle interconnect bus 3521 frequency transitions as in FIG. 6 even when a camera image capture operation, or display image or other image transfer, is in progress and pouring image data into the buffer 3615.*i*.

When the camera 3510.3 is enabled, a period of time of several microseconds elapses between capture operations on successive frames. During this time period, the Camera interface 3610.3 accesses interconnect 3521 and empties a FIFO such as FIFO 3615.3 that was almost filled during a power management transition. Consider the example of an interconnect frequency transition to a lower bus frequency early in a camera frame before end-of-frame. Interconnect bus is decoupled and the interface FIFO fills almost full with image data. Then the frequency transition is completed and the camera interface is again coupled to the interconnect bus. The interface FIFO desirably becomes less filled over time again, provided the bus bandwidth exceeds the bandwidth involved while image data is still pouring into the interface FIFO and onto the bus, and the bus frequency has now been lowered. The interface FIFO need not be totally empty, but desirably becomes less filled so that another DVFS transition can be accommodated after some minimum recovery period. Whether an interface FIFO gets empty again in an interval between camera frames, for instance, depends on bus speed and camera rates. Complete emptying is possible, but is not essential.

When the interconnect frequency is lowered, it is still maintained sufficient to sustain the data rate or bandwidth occupied by activated peripherals and MPU. DVFS adapts the bus frequency to its real usage instead of having it running at maximum speed all the time. In the case of the camera peripheral, the interval between camera frames is camera dependent and is called vertical blanking time. In one example with a 16 MPixel camera, the vertical blanking interval can last up to 30% of the frame duration. Thus at 30 fps, the vertical blanking interval is equal to $\frac{1}{30}$ second divided by about 3, and the interval is about 11 milliseconds. This 16 MPix camera sensor generates about 90 Mbytes-per-second average bandwidth on the bus interconnect. Note that a different camera can have different characteristics. The bus bandwidth is made greater than or at least equal than the camera utilizes to generate image data. But embodiments need not have a very fine granularity on bus speed scaling, and may divide speed by power of 2 (divide-by-2, divide-by-4, etc) for instance. The bus bandwidth is scaled accordingly to use the immediately available interconnect clock frequency that exceeds but comes most nearly to Notice a difference between power management transition latency, which is kept short to keep the system running, and a different subject called initiation pendency herein. Initiation pendency is a less-constraining interval of time after the GO-bit but before a peripheral decouples its interface 3610.*i* from the interconnect bus 3521. Suppose the peripheral circuit FIFO is partially filled from a prior DVFS transition and then PRCM subsequently sends a signal to Start another DVFS transition before the FIFO has sent out enough data to have enough unfilled capacity to support the second DVFS transition. The peripheral FIFO 3615.*i* does not qualify peripheral logic to produce OK_ACK_i. Peripheral SM does not send OK_ACK in FIG. 14 or FIG. 18 until bus interface 3610.*i* has serviced peripheral FIFO 3615.*i* so that the peripheral logic does produce OK_ACK_i. This rapidly occurs and initiation pendency of the START_bit_i is brief.

In FIG. 11 software-based processes of operation are shown. MPU power management related software provides a HLOS Power Management framework that supports DVFS and DPS power management processes and a prediction software process to predict the MPU load. Based on MPU and IVA DSP load predictions, the power management policies adapt dynamically frequency/voltage and enable or disable domain DPS in OS idle thread. A device driver implements on-demand power ON/OFF mechanism (clock gating). Device drivers are notified of device mode changes and infer frequency/voltage changes to program hardware including shadow registers of FIG. 4. IVA power management related software includes a DSP/BIOS Power Management framework that supports DVFS and DPS power management strategy as well. DSP BIOS (Basic Input Output System) has a Workload Monitor which receives loading information from a thread loading Thrload block. The Workload Monitor provides input to a Workload Predictor as well as to a DSP Bridge that is coupled to a counterpart DSP bridge 5012 software block on the MPU. The DSP has a Power Management software PWRM which receives input from the Workload Predictor and controls the Workload Monitor. PWRM receives information from system nodes as shown and outputs information to the DSP Bridge.

In FIG. 11, MPU software has a User layer, a Kernel layer, and a Hardware Abstraction Layer (HAL). In the User layer, Applications software is monitored by a Domain Manager according to a stored Domain Management Policy. A Power Manager bi-directionally communicates with the Domain Manager and with a Power Controller and with Power Handlers 5011, 5021.1,.2, etc., and 5031.1, .2, etc. The Power Handlers 5021.*i*, 5031.*i* configure and control through Device Drivers 5022.1,.2, etc., and 5032.1, .2, etc., the hardware PRCM and Control Module 2765 for chip 1400 (FIG. 23) and any other configurable power management hardware in the system such as for chip 1100 and other system chips and units. One of the Device Drivers sends the Go-bit of FIG. 4 to initiate a hardware-controlled power management transition.

A Resource Manager module manages resources that couple to the HAL. The Resource Manager is bi-directionally coupled with Resource Handler 5013 associated with DSP Bridge 5012. Resource Manager is bi-directionally coupled with Resource Handlers 5023.*i* respectively associated with Device Drivers 5022.*i*. A DVFS/DPS Policy Module and a Static Policy (e.g., SLM policy) block are coupled to a Policy Manager and Resource Handler 5043. The DVFS/DPS Policy Module receives information from the Power Controller and uses it to determine whether DVFS should make an OPP transition and whether DPS should be started or stopped in FIG. 12. The DVFS/DPS Policy Module receives information from an Energy Management Interface (EMI) pertaining to thermal environment and other energy management and power management information. The Policy Manager and Resource Handler 5043 feed information to the Resource Manager. In this way, DPS context save/restore operations are initiated, for instance.

The performance prediction process, for example, delivers a prediction of target frequency related to instructions per second of performance and delivers a prediction that is responsive to and increases with a current number of applications running under the operating system plus a number of applications being launched by the operating system, and responds to any other pertinent factors as discussed in the next three paragraphs. When the target frequency exceeds the DVFS OPP frequency, any DCFS transition is triggered for affected processor(s). When this transition involves DVFS OPP transition of interconnect, the Go-bit of FIG. 4 is issued.

In FIGS. 1 and 4, MPU 2610 is not the only traffic and processing generator pertinent to prediction in FIG. 11. SoC have multiple initiators (MPU, DSP, DSS, DMA, GFX), and embeds multiple peripherals (UART, USB, GPMC, etc). (GFX is Graphics Engine. UART is a Universal Asynchronous Receiver Transmitter or 2-way serial interface to a parallel bus. GPMC is a General Purpose Memory Controller.) SoC power management and QoS are improved by having a global SoC approach, taking into account SoC specificities. Some global power management embodiments monitor processor cores, interconnect and peripherals activities, including processing requirements and memory requirements (bandwidth, latencies). Middleware (multimedia frameworks, drivers) activities are monitored. Monitoring is applied to power-aware applications, and measures Power IC efficiency, and monitors external IC activity (Modem, Bluetooth, Memory). By including the monitoring of other traffic and processing generators besides MPU 2610, Power Management Policies software in FIG. 11 or hardware implementations thereof provide a better prediction, which in turn provides better power savings and better QoS.

Some embodiments monitor DMA and provide DMA 3510.1 load prediction improves QoS in DVFS prediction system embodiment herein. Much interconnect bandwidth is generated by DMA transfer between peripherals and memory 3550. CPU cores such as MPU 2610 and IVA are scaled under DVFS independently of interconnect DVFS. Power consumption herein is reduced by correctly adjusting interconnect 3521 clock frequency, and thus its maximum bandwidth, to application requirements. QoS (Quality of Service) is improved by ensuring that SoC provides just enough performance to meet application requirements. DMA 3510.1 load is monitored and the improved process predicts DMA bandwidth requirements as well as CPU-centric monitoring of CPU idle time and CPU cache statistics. Interconnect scaling is done more dynamically herein by going beyond merely increasing the interconnect OPP as some function of increasing CPU OPP. When DMA 3510.1 is using substantial bandwidth, a control herein allocates a higher interconnect OPP even if the CPU is operating at a relatively low OPP, to provide enhanced performance while reducing SoC power consumption. When the DVFS prediction calls for a transition from one DVFS Interconnect OPP to another Interconnect OPP, the Go-bit is issued by the circuit that is executing the prediction, such as MPU 2610 or a hardware based form of DVFS prediction. Battery life is favorable and SoC performance is increased.

In some embodiments, external memory usage monitoring policy for interconnect DVFS provides efficient interconnect scaling, reduces power consumption of SoC, and minimizes impact of Interconnect DVFS on SoC performance and QoS. SoC integrated circuits, such as applications processors herein combine interconnect scaling with dedicated HW circuitry, such as in memory controller 3552.1, to monitor interconnect 3521 activity and more intelligently control power management. Even when SoCs have several peripherals generating multiple simultaneous memory transfers, most of this traffic is coming from or going to the external RAM 3550. Optimum device interconnect scaling is achieved herein by dynamically adjusting interconnect performance level (i.e. frequency) using external RAM usage statistics (e.g. SDRAM occupancy, efficiency, min/average/max read/write latencies) and scaling the interconnect DVFS voltage and frequency accordingly. If usage statistics go below a configurable lower threshold parameter, the power management circuitry scales down the interconnect OPP. If usage statistics go above a configurable higher threshold parameter the interconnect OPP scaled up. In this way the power management circuitry goes beyond monitoring CPU Idle time (workload) and using power-aware device drivers and applications. Here, memory usage statistics can be economically collected at a single point such as external RAM controller 3552.1, instead of multiple applications or device drivers. Statistics are fully computed by HW. SW is only in charge of performance prediction, minimizing CPU overhead.

A shadow process approach using shadow register 3620.4 is applied relative to display frames and shadow register 3620.3 and camera image frames in a process and structure of power management. In FIG. 3 and FIG. 19, DLLs or DPLLs are coupled to the shadow registers 3620.*i*. Resource Manager software of FIG. 11 commands a frequency change in an uncomplicated way using Go-bit, and the high-level power management state machine PRCM SM takes care of the power management controls and sequencing comprehensively. Synchronizing hardware including Peripheral SM of FIG. 15 is architecturally situated on top of the shadow registers 3620.*i* to synchronize all the system modules 3510.*i*, 3552.1, MPU 2610 that are subject to power management. Preparation of modules is done in parallel in the processes being synchronized. The high level power management state machine PRCM SM triggers a sequence of power management controls as discussed elsewhere herein in connection with FIGS. 4, 6-9, 13-14, 16-18, and other Figures.

Software in FIG. 11 no longer needs to wait for a condition such as a 16 ms Camera end-of-frame event prior to initiating a power management transition. Also, in FIG. 11 software no longer is stymied or blocked by system latency issues that have otherwise precluded some power management transitions to more nearly optimal states. Instead, PRCM hardware 3570 in FIGS. 1 and 4 comprehensively manages the frequency and/or voltage transition.

In FIG. 11, the DVFS efficiency is improved using any comprehensive hardware power management embodiment as described herein, and is verified on test by relatively short duration of a power management transition on the memory bus 3521. Also, very short intervals of CPU stall cycles, or none, associated with DVFS transitions are a desirable result of the use of such hardware power management processes and structures. Software source code may need to include a complicated synchronization mechanism between SW components unless comprehensive hardware-based DVFS power management control circuitry is provided as described herein. Complicated SW support like pre/post notifications and suspend/resume mechanisms are obviated by using the HW controlled power management embodiments herein. Such complicated software support thus need not be provided in FIG. 11.

Figure 12:
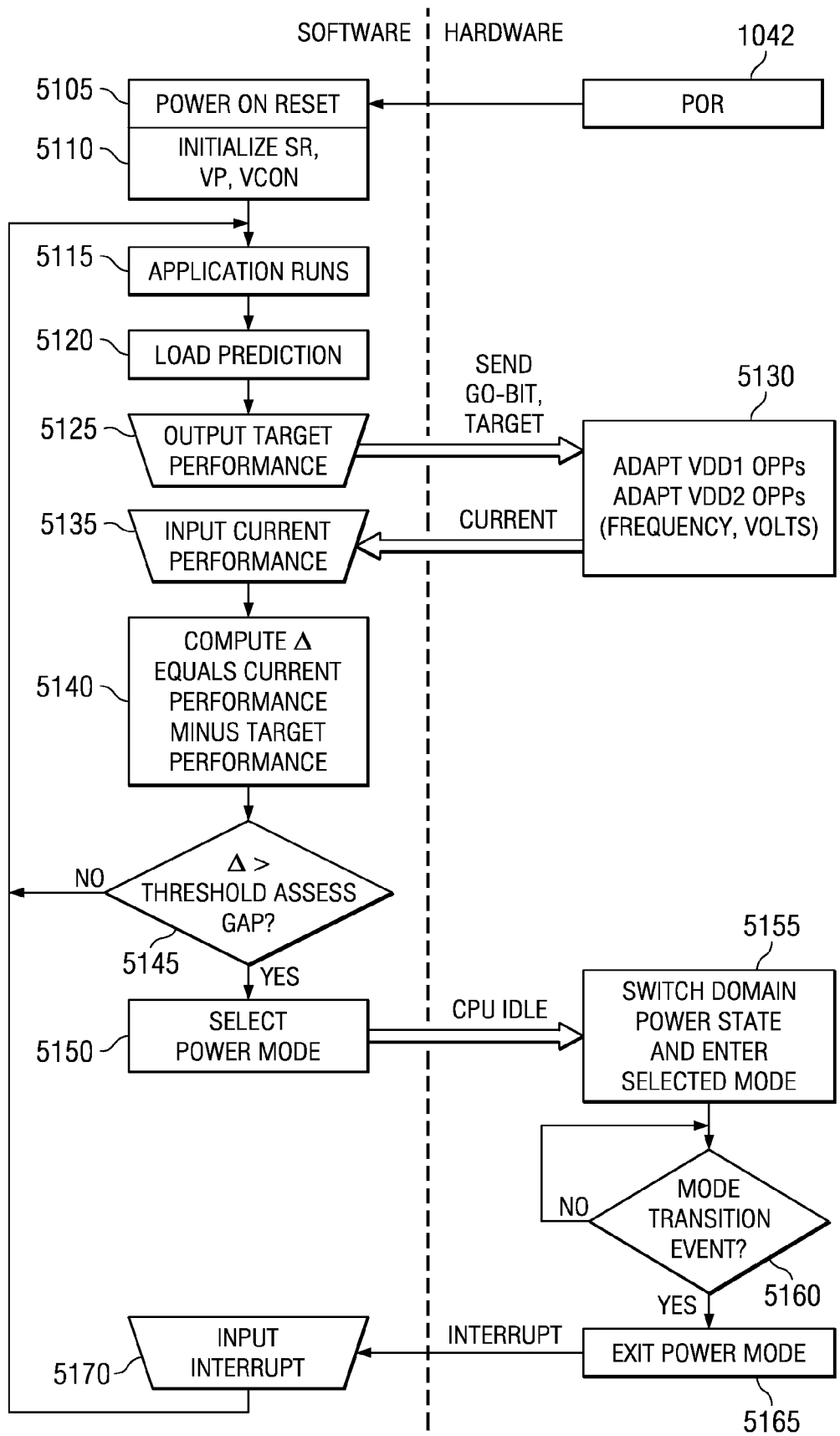
FIG. 12 is a combined flow diagram of power management operations for use with the processes of the other Figures, showing software operations at left and hardware operations at right.

In FIG. 12, power management strategies are combined. Software operations are shown by way of example in a column SW and hardware operations are shown for example in a column HW. Power On Reset POR 1042 resets the chip 1400 at a step 5105 and commences the mixed process. A step 5110 initializes the AVS Sensor modules SR1 and SR2, and initializes the Voltage Processor VP and the Voltage Controller VCON of FIG. 20. In a succeeding step 5115, an application or peripheral runs or completes on the system and interconnect bus 3521 needs to be power managed.

In a step 5120 a load or performance prediction is made for the interconnect bus based on peripheral operations. Then a step 5125 outputs the target performance to the PRCM and sends Go-bit through a Device Driver to PRCM. A PRCM hardware operation 5130 adapts the DVFS OPPs for the VDD1 voltage domain, adapts the DVFS OPPs for the VDD2 voltage domain, and adapts the DVFS OPPs for any other DVFS controlled VDDx voltage domain. See also FIGS. 4-8 and FIGS. 13-18 for further embodiments herein. This adaptation or adjustment of an OPP involves a change of frequency F and/or a change of voltage V. The PRCM reports back that the adaptation is completed.

The clock scaling in step 5130 of FIG. 12 involves relocking a delay lock loop DLL inside the SDRAM Refresh Controller of External Memory Interface EMIF. During the DLL relock time on the order of microseconds, the DDR SDRAM memory access is not stalled but instead continues desirably to run using suitably sized FIFO 3615.1 in memory controller 3552.1. This constraint is handled in some of the modules as follows. The Camera module 3510.3 continues to run, using suitably-sized FIFO 3615.3, instead of being paused or stopped during interconnect clock scaling steps. The DMA 3510.1 request latency is increased and can affect operation of some peripherals serviced by DMA. The processors 2610, IVA are arranged to either execute from internal memory caches or on-chip memory. The display controller 3510.4 relies on its internal FIFO during this time.

Figure 16:
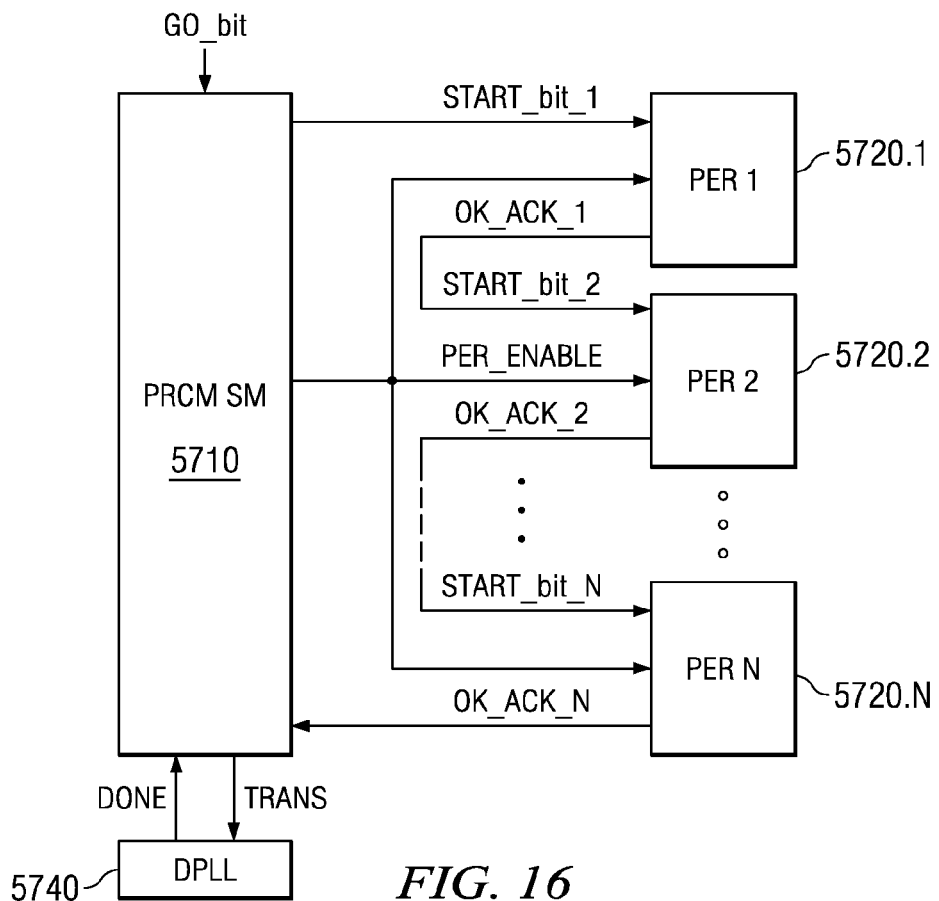
FIG. 16 is a block diagram of another inventive hardware based power management embodiment showing another inventive state machine PRCM SM and peripherals coupled in an inventive Daisy Chain power management arrangement.

A software step 5135 inputs, confirms, or updates the current OPP. A succeeding DPS step 5140 computes a metric representing an amount of difference Δ, discrepancy, disparity or gap between the current performance and the target performance of step 5125. Then a decision step 5145 assesses the gap by comparing the metric with a configured or predetermined threshold value THRESHOLDi (FIG. 10) for assessing DPS margin to determine whether DPS power management should be activated or stopped. In FIG. 16, if step 5145 determines that the threshold is not exceeded or the gap is otherwise insignificant, then operations loop back to step 5115 to continue to run the application under the present conditions.

If step 5145 determines that the DPS threshold is exceeded or the gap is otherwise significant, then a step 5150 selects a power mode to either deliver less power as appropriate. Step 5150 activates a hardware operation 5155 to switch one or more domain power states and enter the selected power mode such as SLM when the application or peripheral completes. Then hardware determines at a step 5160 whether the selected domain power states are now established and monitors until the switching is fully completed. Also at step 5160 hardware determines whether any hardware based mode transition event has occurred, such as a wakeup signal coming from a peripheral. Upon such completion or event, a succeeding step 5165 represents exit from the previous power mode, whereupon an interrupt of step 5170 is fed to the MPU and an application may run at step 5115 in the selected power mode.

In some other embodiments, external memory usage monitoring policy for interconnect DVFS provides efficient interconnect scaling, reduces power consumption of SoC, and minimizes impact of Interconnect DVFS on SoC performance and QoS. SoC integrated circuits, such as applications processors herein combine interconnect scaling with dedicated HW circuitry, such as in memory controller 3552.1, to monitor interconnect 3521 activity and more intelligently control power management. Even when SoCs have several peripherals generating multiple simultaneous memory transfers, most of this traffic is coming from or going to the external RAM 3550. Optimum device interconnect scaling is achieved herein by dynamically adjusting interconnect performance level (i.e. frequency) using external RAM usage statistics (e.g. SDRAM occupancy, efficiency, min/average/max read/write latencies) and scaling the interconnect DVFS voltage and frequency accordingly. If usage statistics go below a configurable lower threshold parameter, the power management circuitry scales down the interconnect OPP. If usage statistics go above a configurable higher threshold parameter the interconnect OPP scaled up. In this way the power management circuitry goes beyond monitoring CPU Idle time (workload) and using power-aware device drivers and applications. Here, memory usage statistics can be economically collected at a single point such as external RAM controller 3552.1, instead of multiple applications or device drivers. Statistics are fully computed by HW. SW is only in charge of performance prediction, minimizing CPU overhead.

Figure 13:
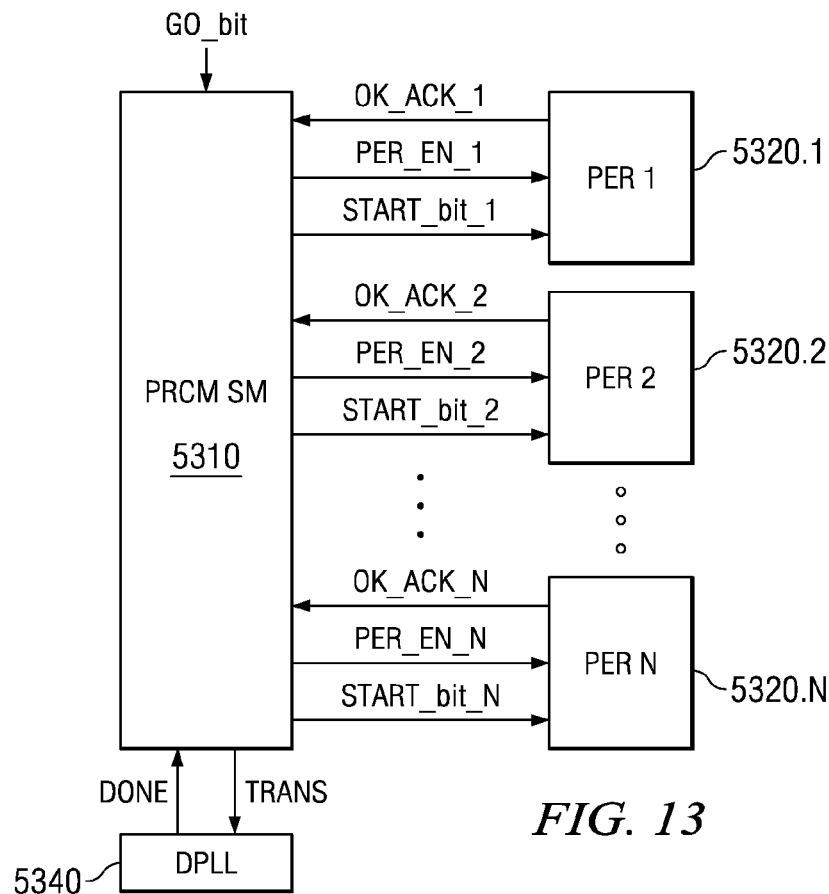
FIG. 13 is a block diagram of an inventive hardware based power management embodiment showing an inventive supervisory state machine PRCM SM and control paths coupled to various peripherals in the system of FIGS. 1-4 in a hub-and-spoke power management arrangement.

In FIG. 13, DVFS logic in the PRCM 3570 of FIG. 4 includes a high-level power management transition scheduling state machine PRCM SM 5310 coupled to the clock manager. The power management transition scheduling state machine 5310 in some embodiments has logic centrally located and concentrated in the PRCM 3570 and couples control signals as outputs from the state machine 5310 distributed hub-and-spoke to the shadow register control circuits in the various peripherals 3552.1, 3510.i or 5320.i as in FIG. 13. This type of embodiment centralizes power management control over the peripherals 5320.i using the power management control state machine PRCM SM 5310 for centralized interconnect clock management in a hub-and-spoke structure. The power management transition scheduling state machine PRCM SM suitably has a state transition diagram with state bubbles or nodes of the diagram corresponding to the process steps of FIG. 14.

Figure 14:
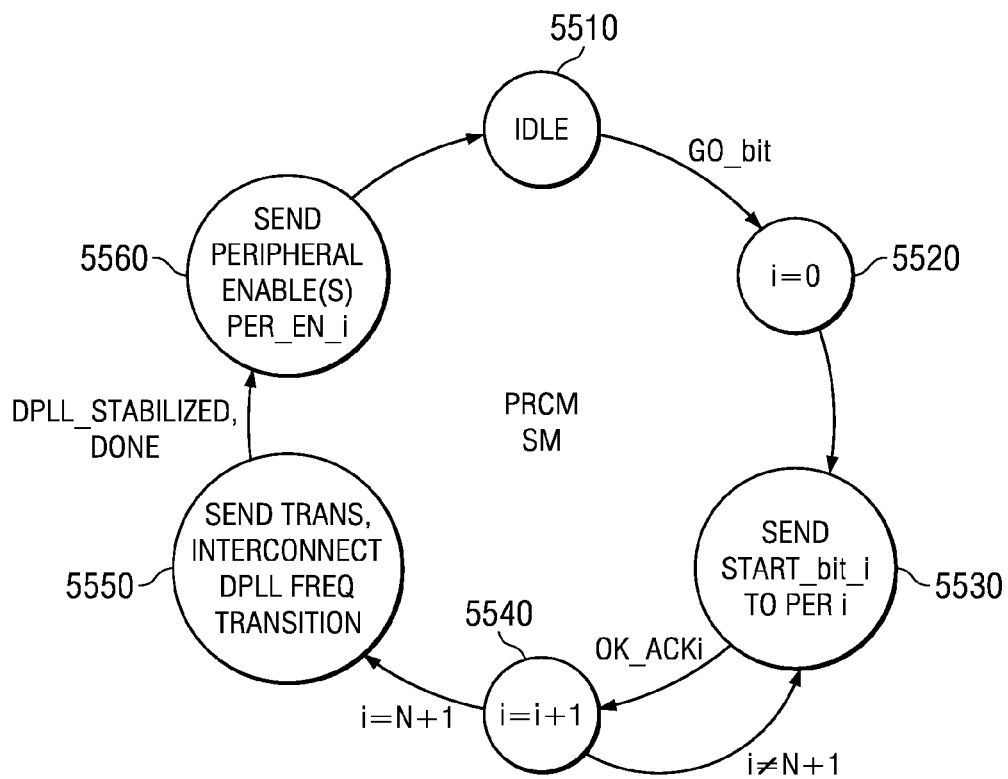
FIG. 14 is a state transition diagram for the inventive supervisory state machine PRCM SM of FIG. 13.
Figure 15:
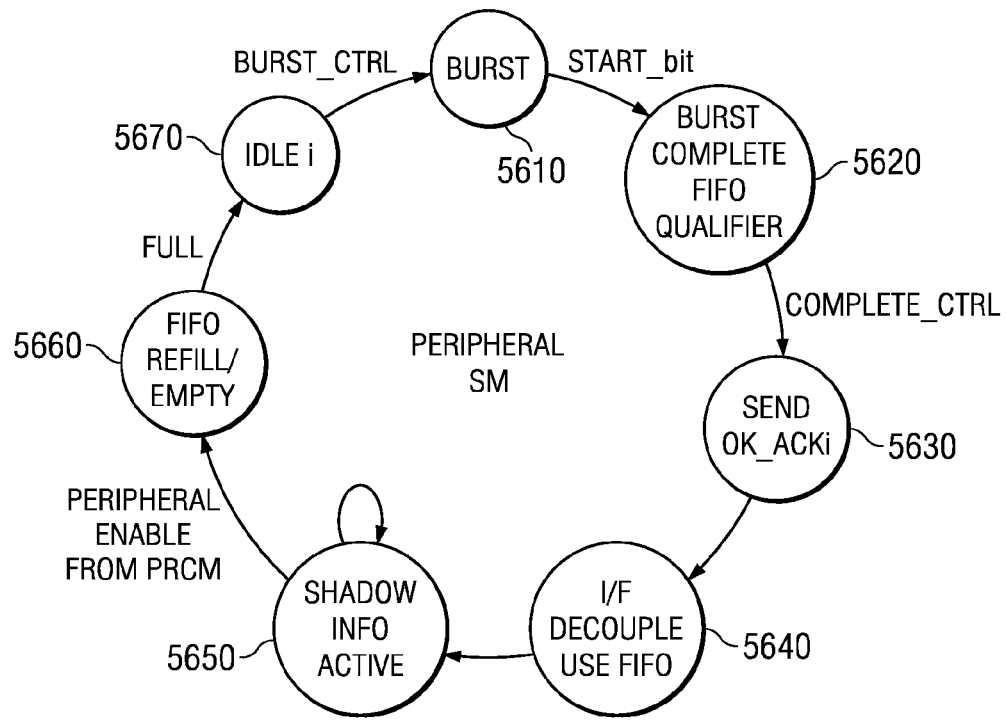
FIG. 15 is a state transition diagram for an inventive peripheral state machine SM in each of the supervised peripherals of FIGS. 13, 16, and 17.

In FIG. 14, state transition operations of an embodiment of PRCM SM commence with an IDLE state 5510. When the GO_bit from the MPU 2610 is received, operations transition to a step 5520 that initializes an index i to zero. Then operations go to a state 5530 and send a starting signal START_bit_i to the various peripherals i in FIG. 13 sequentially using an incrementing state 5540 as well. A given peripheral i of FIG. 13 in due course responds with acknowledgment signal OK_ACK_i (i=1, 2, . . . N) and PRCM SM in FIG. 14 alternates between states 5530 and 5540 until all N of the peripherals have acknowledged. Then operations in PRCM SM transition from state 5540 to a state 5550 that sends transition initiation signal TRANS to initiate and/or control a frequency transition by the interconnect DPLL 5340. DPLL 5340 completes its frequency transition and returns a DONE signal DPLL_STABILIZED to PRCM SM. Then PRCM SM goes from state 5550 to a state 5560 and sends out the re-enabling signal Peripheral Enable i PER_EN_i to all the peripherals i, whereupon operations go back to IDLE 5510.

In an augmented embodiment, the scheduling state machine PRCM SM is augmented to provide states and state transitions as described in connection with FIGS. 7 and 8 to control and effectuate voltage changes as well as frequency changes to various parts of the system. Briefly, for example as in FIG. 8, an increase of voltage is completed before the frequency change, if the frequency is to be increased. The increase of voltage is suitably driven by circuitry under control of PRCM SM that increases the voltage along an upward slope versus time, while maintaining the not-yet-increased frequency unchanged during the voltage increase ramp. Conversely, as in FIG. 7, a decrease of frequency is completed before a decrease of voltage is performed. The latter decrease of voltage is suitably driven by circuitry that reduces the voltage along a constant downward slope versus time, while maintaining the newly decreased frequency during the interval of voltage reduction.

Microprocessor MPU 2610 is provided with simplified Resource Manager software in FIG. 11 that determines the new frequency and voltage and pre-programs the shadow registers 3620.i accordingly. In some other embodiments, the system instead boots up and loads the PRCM 3570 with configurations, and the PRCM 3570 itself pre-programs the shadow registers of the peripherals. Then MPU 2610 sends a signal in either case, called a Go-bit herein and shown in FIG. 4, to the power management transition scheduling state machine PRCM SM (FIGS. 13, 14, 16, 17, 18) in the PRCM 3570, whereupon that state machine PRCM SM operates according to a respective state transition diagram shown in FIGS. 14 and 18. PRCM SM goes out of idle and transitions through the states represented by the process diagram of FIGS. 9, 14, and 18. The state machine PRCM SM sequences the clock manager CM part of the PRCM 3570, as well as delivering the transition initiation signal START_bit_i to the peripherals 3510.i (and a frequency selection signal k if it is used to select preprogrammed parameters Pk in the peripherals 3510.i).

In FIG. 15, the operations of a peripheral state machine SM are described according to its state transition diagram. Suppose the peripheral 3510.i, 3552.1 is generating data or is the target for a data transfer, either operation activating a first control signal BURST_CTRL that transitions operations to a first transfer state BURST 5610. When PRCM 3570 issues a START_bit_i, the Peripheral SM responds to START_bit_i by a state 5620 completing the burst and generating a FIFO qualifier that the FIFO is ready. Logic circuitry in the peripheral responds to the completion of the burst and to the FIFO qualifier and in turn generates a completion signal COMPLETE_CTRL so that a state 5630 is reached. State 5630 sends acknowledgment signal OK_ACK_i from peripheral i to PRCM 3570. PRCM 3570 receives the various acknowledgment signals OK_ACK_i from the peripherals so that the DVFS transition is accomplished rapidly, safely, verifiably and effectively. Then the PRCM state machine PRCM SM sends a re-enabling signal called Peripheral Enable i and designated PER_EN_i to the peripherals to enable them either concurrently or in a sequence appropriate to the system blocks used in a particular system architecture. In the meantime, the Peripheral SM of FIG. 15 transitions from state 5630 to a state 5640 that decouples interface 3610.i from FIG. 4 interconnect bus 3521, and uses FIFO 3615.i. Then operations transition to a state 5650 that promotes shadow information in shadow register 3620.i to currently-active information in register 3625.i. Promotion of the shadow information by state 5650 can occur automatically after state 5640 and/or occur in response to signal Peripheral Enable i from PRCM 3570. After state 5650 and after Peripheral Enable i is received, operations go to a state 5660 that again couples interface 3610.i to interconnect bus 3521 so that the FIFO 3615.i generates an EMPTY/FULL signal and can begin refilling or emptying such as by activating BURST_CTRL. State 5660 is at least approximately the reverse of state 5640 in operation. Then state 5670 IDLE_i is reached, whereupon burst operations may commence.

In FIG. 4 and FIG. 15 in the transition process, synchronization of the peripherals 3510.i, 3552.1 desirably happens fast. A camera peripheral 3510.3 has changes made to its settings, performance level, and/or frame size. The MPU 2610 suitably configures a latency parameter(s) of memory controller 3552.1 according to respective memory controller 3552.1 functions.

A display peripheral 3510.4 may have 16 ms (milli-seconds) per frame. Before changing a clock frequency, a complicated software approach might stop all peripheral controllers and all bus traffic for a latency interval or period of time. This latency interval might last up to 16 ms from the instant in time the microprocessor MPU 2610 determines to order a change of clock frequency and then waits for the latency interval to elapse until a frame interval completes at the display peripheral 3510.4. The up-to-16 milliseconds long and variable latency interval is dramatically reduced down to an order of magnitude of a few microseconds or less by hardware control using the power management transition state machine PRCM SM and shadow registers 3620.i herein. A buffer FIFO 3615.4 in the display controller 3510.4 is appropriately sized to accommodate an amount of display information for use by the display controller 3510.4 during a latency interval of the hardware control process, e.g., a few microseconds or five (5) microseconds or less for video and/or audio in FIG. 6, or a millisecond or so for audio in FIGS. 7-8.

In FIG. 4, MPU 2610 sends the Go-bit on line 3650 and starts the power management transition state machine PRCM SM operation. See PRCM SM 5310 in FIG. 13, 5710 in FIG. 16 and 5810 in FIG. 17, and applicable PRCM SM operational processes in FIGS. 14 and 18. During this operation, the display controller 3510.4 is effectively and acceptably disconnected from bus 3521 that might otherwise deliver display information to the display peripheral 3510.4. This is no problem because the display controller buffer FIFO 3615.4 has enough backlog of this display information in order for the display controller 3510.4 to continue to operate independently of the system bus 3521. Notice that the FIFO 3615.4 capacity is here provided free of the latency interval (up-to-16 ms as in FIG. 5), but instead readily accommodates the hardware controlled frequency transition latency of FIG. 6 that is only on the order of a few microseconds.

Figure 18:
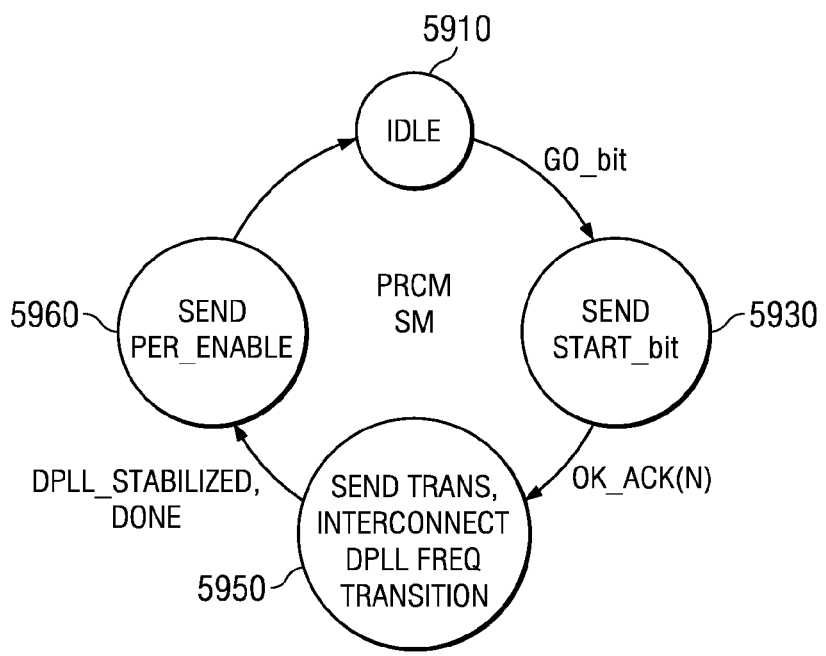
FIG. 18 is a state transition diagram for the inventive state machine PRCM SM of FIG. 16 and FIG. 17.

The power management transition state machine PRCM SM of FIG. 14 or FIG. 18 is a system client and owner of the centralized frequency transition hardware mechanism. That state machine operates by cycling through the process of FIG. 6 during such a short frequency transition latency (microseconds) that the display controller buffer FIFO 3615.4, for example, is beneficially used and not emptied. Thereupon, the transition initiation signal START_bit_4 from state machine PRCM SM is provided to the display controller shadow register circuitry 3620.4. That shadow register circuitry 3620.4 has a Peripheral State Machine SM of FIG. 15 and responds with a handshake completion signal OK_ACK_4. PRCM SM then sends the reenable signal PER_EN_4. In response to PER_EN_4, the display controller 3510.4 is swiftly synchronized to the system bus 3521, which is now active at a new clock frequency F. Display information is rapidly transferred over the system bus 3521 to refill the display controller buffer FIFO 3615.4.

In the process just described, the display controller 3510.4 seamlessly runs off the bus 3521 that de-couples from the bus 3521 in response to START_bit_4, and then runs the display using FIFO 3615.4 independently of the bus 3521 throughout the frequency transition process of FIG. 6. Then in response to re-enable signal PER_EN_4, display controller 3510.4 synchronizes and is again coupled to the system bus 3521 for information transfer, with the overall result that the user experience is continually satisfactory. Moreover, the improved architecture of power management transition state machine PRCM SM, together with shadow register circuitry and associated logic 3620.i in the peripherals 3510.i, now provides such reduced frequency transition latency in the power management process that frequency transitions can be made more frequently and dynamically in response to actual system needs for power management and the overall power and energy consumption of the system are consequently decreased.

In FIG. 16, another alternative category of embodiments provides a power management transition control architecture that distributes functions of the power management transition state machine described above into less centralized hardware control blocks in the peripherals 3510.i and has a somewhat less extensive block in the PRCM 3570, see FIG. 18. Instead of the hub-and-spoke category of embodiments of FIG. 13, this alternative category of embodiments of FIG. 16 provides a more decentralized and peer-networked type of architecture. In some of these alternative embodiments, the process flow in the hardware roughly corresponds to a set of hardware blocks ABCDE handing control off to each either in an order A->B->C->D->E->A, or some approximation thereto, wherein the order of control handoff is established either by hardwiring in FIG. 16 or according to configured signaling. Put another way, the power management transition state machine is distributed over the PRCM 3570 and the peripherals 3510.i so that blocks of circuitry that handle some of the respective states is situated in the corresponding peripherals 3510.i, whereby the amount of the circuitry concentrated in the PRCM 3570 is significantly reduced, corresponding to the simpler PRCM SM of FIG. 18, and any benefits in timing of the various controls are enjoyed.

In FIG. 16 this alternative type of embodiment, called a Daisy Chain embodiment herein, somewhat decentralizes the power management control as between the PRCM 5710 clock manager CM and the peripherals 5720.i (PER 1-PER N). In one such type of embodiment, the FIG. 4 MPU 2610 supplies the Go bit to the FIG. 16 power management control state machine PRCM SM 5710, which sends the Start command START_bit_1 to a first peripheral control logic circuit SM 5720.1 of FIG. 15. First peripheral control logic circuit SM 5720.1 then issues OK_ACK_1, which so to speak, relays the Start command to a second peripheral control logic circuit SM 5720.2, which issues OK_ACK_2 and thus relays the Start command to a succeeding peripheral control logic circuit SM 5720.i, whereupon an acknowledgment signal OK_ACK_N is returned to the power management control state machine by a last peripheral 5720.N in this example of a Daisy Chain embodiment.

The relaying of the Start command between peripherals 5720.i to take account of sequential or parallel starting is accomplished according to each respective configuration established by the MPU 2610 in a peripheral configuration register in each peripheral. When a given Start command is received by a given peripheral 5720.i, then that peripheral responds as in FIG. 9 steps 4830 and 4835, and the given Start command is relayed as a Start signal for each peripheral to which that Start signal is coupled.

As each peripheral 5720.i responds to its Start signal as in FIG. 9 steps 4830 and 4835, a small Start latency occurs and is distinct from the subsequent latency involved in changing the frequency on the interconnect. In peripherals that operate independently, none of them wait for the Start latency to be completed before handing or relaying the Start command itself to the next peripherals. In FIG. 16, for peripherals 5720.i that operate in succession, the OK_ACK_i signal is obtained from the given peripheral 5720.i and coupled the next peripheral 5720.(i+1) in succession as the Start signal START_bit_(i+1) to that next peripheral 5720.(i+1). In the FIG. 16 case of peripherals 5720.i that operate in succession, the Start latencies may add to each other, but the cost and latency and increased FIFO 3615.i size needed to accommodate the increase in latency is believed to be acceptable for at least some systems since the Start latencies are small. A re-enabling signal PER_ENABLE is coupled on a shared line from PRCM SM to all the peripherals 5720.i when the power transition completes.

Figure 17:
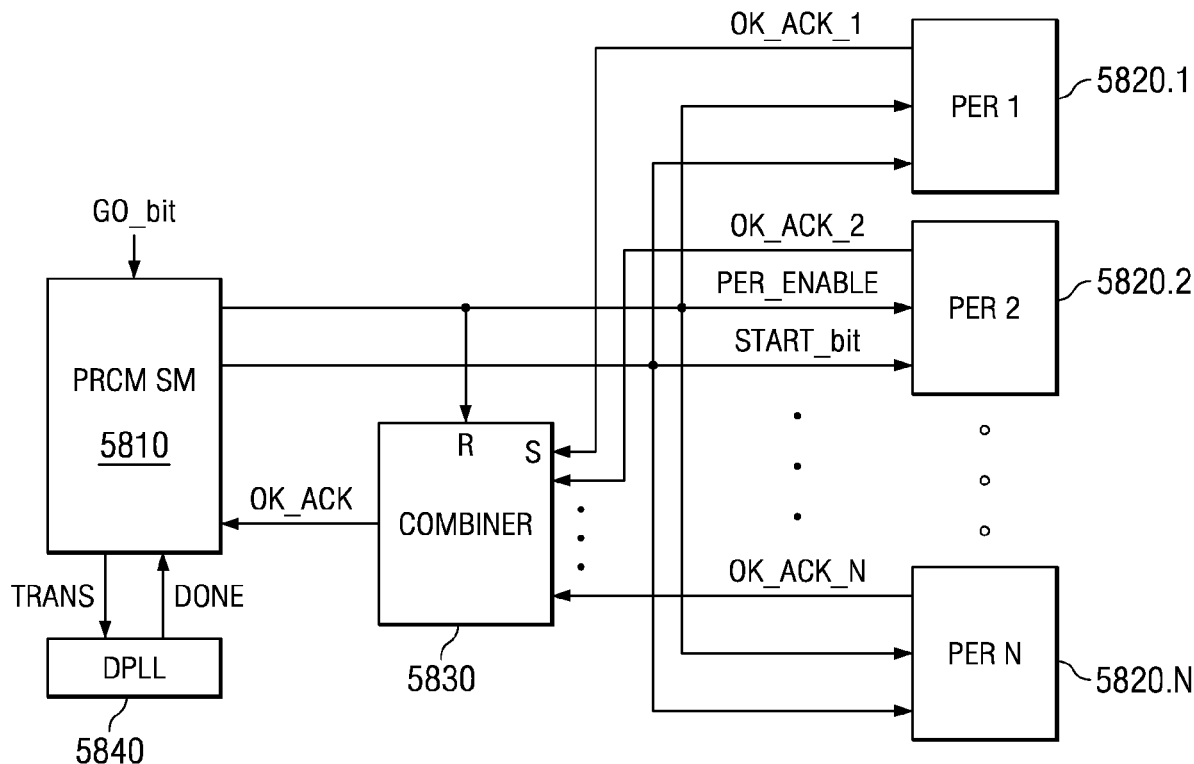
FIG. 17 is a block diagram of another inventive hardware based power management embodiment showing an inventive state machine PRCM SM, peripherals, and combiner block coupled in a combined power management arrangement.

In FIG. 17, PRCM 3570 has a PRCM SM 5810 that in response to Go_bit sends a single START_bit signal concurrently to a set of peripherals 5820.i. The FIG. 4 peripheral interfaces 3610.i then decouple from the bus 3521. In FIG. 17, peripherals 5820.i then handshake in general at different times with their respective reply signals OK_ACK_i. A combiner circuit 5830 receives the handshakes, and when all the handshakes have occurred, a single combiner output signal OK_ACK is delivered to PRCM SM 5810. Combiner circuit 5830 is suitably implemented with a set of RS flip-flops 5820 responsive to the reply signals OK_ACK_i, and a flip-flops feeding respective inputs of a shared NAND-gate that supplies the single combiner output signal OK_ACK. The peripherals continue to run using their FIFO buffers while decoupled from the bus 3521. PRCM SM responds to OK_ACK by sending signal TRANS to DPLL 5840 to change frequency F. DPLL 5840 responds with a DONE signal to PRCM SM 5810. PRCM SM 5810 then re-enables the interfaces of peripherals 5820.i by sending a single signal PER_ENABLE to all of the peripherals 5820.i. Each of the peripherals 5820.i automatically converts or promotes its shadow settings to currently-effective settings applicable to making bus interface operations of that particular peripheral compatible with the new bus 3521 frequency F so that bus operations resume.

In FIG. 18, state transition operations of an alternative form of PRCM SM commence with an IDLE state 5910. When the GO_bit from the MPU is received, operations transition to a state 5930 and send a START_bit, or multiple signals START_bit_i, to the various peripherals. The peripherals in due course respond with acknowledgments and signal OK_ACK_N of FIG. 16 or combiner acknowledgment signal OK_ACK of FIG. 17 is received at PRCM SM of FIG. 18. Then operations in PRCM SM transition from state 5930 to a state 5950 that sends the signal TRANS to initiate and/or control a frequency transition by the interconnect DPLL 5740 or 5840. The DPLL completes its frequency transition and returns a DONE signal DPLL_STABILIZED to PRCM SM. Then PRCM SM goes from state 5950 to a state 5960 and sends out the re-enabling signal Peripheral Enable PER_ENABLE to the peripherals, whereupon operations go back to IDLE 5910.

In FIG. 19, the MPU DPLL and IVA DPLL each receive two inputs clocks: 1) the system clock which is used by the DPLLs to produce their synthesized clock, and 2) a high speed bypass clock, which is interconnect 3521 divided clock programmably divided by 1 or 2. The high speed bypass clock is used or can optionally be used when the DPLLs are set in bypass mode either statically, or dynamically during re-lock time. The high speed bypass clock allows saving processors DPLL power consumption when the processors do not need to run faster than at interconnect 3521 clock speed, or optimizing performance during frequency scaling. As soon as a processor DPLL enters bypass, high speed bypass clock (and not system clock) is output.

Many embodiments are likely to have interconnect clock frequency F and system clock frequency SysClk each in a range of 10 MHz to 10 GHz. Many embodiments are also likely to have interconnect clock frequency F and system clock frequency SysClk each in the hundreds of megahertz, such as in the range 100 MHz to 1 GHz or more. Other frequency values F and SysClk outside the aforementioned ranges are also feasible.

In FIG. 19, in response to configuration via register bus REG BUS of Control Registers 6110 fields, system clock SYS_CLK is multiplied by M and divided by N+1 to establish a particular clock output frequency CLKOUT of Clock Manager CM. DPLL is illustrated with collateral arrows representing signal lines for TRANS and DONE. DPLL provides an output frequency ramping feature when switching from the bypass clock to the synthesized clock during lock and relock period. The frequency ramping is executed in steps in frequency. Then a signal DONE (DPLL_STABILIZED) is asserted when DPLL output frequency becomes stable. A field RAMPTIME[:] in a PRCM register in control registers 6110 specifies the total duration of the ramp, or specifies that frequency ramping is omitted. Control of DPLLs supports several power modes. Each DPLL power mode establishes a different trade-off between power saving and DPLL re-lock time period. The PRCM hardware also introduces sequencing in the transitions between the DPLL power modes. Each next power mode is configurable.

Crystal oscillator 6114 of FIG. 19 has a clock output coupled by a controlled switch 6121 to a controlled divider 6122. Switch 6121 also couples oscillator clock via a controlled switch 6126 to a USB serial interface block, and via another controlled switch 6128 to one or more Sensor Modules SR. Controlled divider 6122 has an output coupled via a controlled switch 6124 to an input controlled switches 6132, 6142, 6184, and to an input of a clock divider 6150, and via a system clock line SYS.CLK to a first input of a Mux 6158.

Switch 6132 passes system clock SYSCLK to the controllable DPLL3 6130 for the Core domain. DPLL3 provides a clock output to the Clock Manager CM. Switch 6142 is an example of replicated circuitry that provides system clock to a DPLL such as DPLL4 or DPLL5. The respective DPLL4 or DPLL5 provides DPLL clock to a controlled switch 6144 that in turn supplies each of controlled switches 6146 and 6148. Switch 6146 supplies a mux for clock a Peripheral domain. Switch 6148 provides another clock to Clock Manager CM. System clock from switch 6124 is also coupled by switch 6184 by a CM System Clock line CMSYS.CLK to the CM. Divided system clock from divider 6150 is fed via a controlled switch 6152 to a Mux 6154, that in turn provides an output Module.FCLK. The circuitry of one, some or all of divider 6150, switch 6152, and/or Mux 6154 is suitably replicated and rearranged or modified as appropriate to controllably deliver module functional clocks to many respective power modules.

In FIG. 19, 32 KHz oscillator 6118 is coupled via a controlled switch 6156 to a line CM32K.CLK to the Clock Manager CM. An unswitched line FUNC32K.CLK couples the 32 KHz oscillator 6118 to the second input of the Mux 6158. A selector control of Mux 6158 is also coupled to Control Registers 6110. The Mux 6158 has an output that feeds a selected one of either system clock SYS.CLK or the just-mentioned FUNC32K.CLK to a controlled switch 6159 and on to the Wakeup domain WKUP. An external Wakeup signal such as IO Pad Device_wakeup line is coupled to control the controlled switch 6159. Using Mux 6158, the Wakeup domain WKUP is selectively either in a sleep mode on FUNC32K.CLK or more fully active on system clock SYS.CLK. If Switch 6159 is opened, the WKUP domain is not clocked and is in an Off condition. Closing switch 6159 in response to the external Wakeup signal moves the WKUP domain to a clocked mode that depends on the selection by Mux 6158.

In FIG. 19, the description turns to the Clock Manager CM, enclosed by dashed line in the illustration. Core DPLL3 6130 feeds a set of clock dividers 6160.1, 6160.2, 6160.3, 6160.4 in the Clock Manager CM and independently controlled by control register 6110. Clock divider 6160.1 is coupled via controlled switch 6162.1 to MPU DPLL1. Clock divider 6160.2 is coupled via controlled switch 6162.2 to IVA DPLL2. Clock divider 6160.3 is coupled via controlled switch 6162.3 to a Security accelerators block. Clock divider 6160.4 is coupled via controlled switch 6162.4 to a Display block, see FIGS. 1, 4, 23. Notice that Core DPLL3 is in series farther up the clock chain, which facilitates an interlock or clock dependency guarantee wherein Core DPLL3 is previously activated before the downstream clocked blocks are provided with clock.

Further in Clock Manager CM of FIG. 19, a controlled divider 6170 has its input coupled by a controlled switch 6172 back to controlled switch 6148 of the PRM. Divider 6170 has an output coupled to a first input of a Mux 6174. A second input of the Mux 6174 is coupled to an external clock EXT. CLK in case a module fed by Mux 6174 should be externally or internally clocked. For example, if an internal module needs to be clock-slaved to an external module, then external clocking of the internal module may be appropriate. Mux 6174 has an output coupled a controlled divider 6176 that in turn is coupled via a controlled switch 6178 to a clocked module such as the HDQ interface useful for battery monitoring for instance. Mux 6174 has its output also coupled via a controlled switch 6179 to suitable clocked circuitry such as a UART, or Universal Asynchronous Receiver Transmitter (2-way serial interface).

Clock Manager CM of FIG. 19 further has a Mux 6180 with a first input coupled via a controlled switch 6182 to line CMSYS.CLK to controlled switch 6184 in the PRM. Mux 6180 has a second input coupled via a controlled switch 6188 to line CM32K.CLK from controlled switch 6156 in the PRM. Mux 6180 has its output coupled to a Peripheral domain PER.

As shown in FIG. 19, the Control Registers 6110 are coupled to most or all of the controlled switches, controlled dividers, Mux selector inputs, and controlled DPLLs in order to provide configurable and flexible control of clocking of various power domains and to accommodate dependencies of various modules in a system. Switching provides a clock off or clock on mode. The type of clock selected, such as crystal oscillator clock, 32 KHz clock and/or external clock EXT. CLK provides flexibility of clocking for the system. DPLLs provide clock multiplication by a factor M, and clock divider(s) provide clock division by a factor N for each particular module so connected. In this way, OPP frequencies F in FIG. 10 are flexibly controlled over a range of discrete selectable clock frequencies.

In FIGS. 1-4 and FIGS. 19-20, the PRCM 3570 has an OCP (Open Control Protocol) bus interface to access PRM control and status registers. This OCP interface runs off the system clock and is connected to the wakeup block. The PRM registers of FIG. 20 include Control Registers 6110 on register bus REG BUS of FIG. 19 and are used, for instance, for DVFS/DPS power managed operation according to embodiments herein. Some embodiments situate the PRM registers of FIG. 20 and Control Registers 6110 of FIG. 19 in the Control Module 2765 of FIG. 1. Other embodiments have the PRM registers and Control Registers 6110 separate and configurable and run-time re-configurable from Control Module 2765 and/or the OCP bus from MPU and/or IVA processors. Some hardware-controlled embodiments load the contents of the PRM registers and Control Registers 6110 from and under the control of the Device FSM (Finite State Machine) of FIG. 20 and control those registers to power manage the system. Higher level parameters or controls on functionality of Device FSM are configurable by boot or initialization software from MPU and/or IVA processors, see FIG. 11.

In AVS circuitry of FIG. 20, one or more sensor modules SR1, SR2 have ring oscillators or delay lines established on the physical silicon of an application processor integrated circuit chip 1400 of FIG. 23. The ring oscillators by their frequency output gauge the performance of the silicon within the current environmental factors established by the integrated circuit fabrication process in which the chip was made, the currently-applied operating voltage, and the currently-existing operating temperature at a present moment of run-time. See for some background, e.g., US Patent Application Publication US2005/0194592 dated Sep. 8, 2005, which is hereby incorporated herein by reference.

For each voltage domain, there are pre-defined OPPs of FIG. 10. To each OPP corresponds an N-count value that is set, configured into, or built into Sensor Error unit SR of FIGS. 2 and 20 and which represents a simulated or reference oscillator frequency. This N-count value is derived through a combination of static timing analysis and spice analysis and is related to the frequency of the ring oscillator for the particular OPP. The SR circuit continuously compares the N-count value to the on-chip sensor module SR measured frequency of the oscillator. The sensor SR circuit processes the difference and derives an error output that indicates whether to raise or lower the voltage. The error is output on SR interface and is related to the actual voltage step that needs to be applied.

In FIG. 20, each voltage processor VP monitors the error output on its associated SR1 or SR2 interface and converts the error output into a voltage level datum sent over the I2C serial link by the voltage controller VCON in Active mode with commands from voltage state machine FSM to the external SMPS in chip 1200. When the device is in Standby mode, the voltage controller VCON is then driven by the voltage state machines FSMs to allow the external supply to enter low power mode. The sensors SR, the voltage processor VP, the voltage controller VCON and the external SMPS are coupled to form a closed loop feedback system that automatically adapts the voltage of each voltage domain to a minimum voltage that matches the domain frequency, process and temperature operating conditions.

The voltage controller VCON selects VDD1 and VDD2 SMPS modes of operation by writing over the I2C interface a respective multi-bit command value at the respective address of VDD1 and VDD2 command configuration registers. The multi-bit command values correspond, for instance, to ON or Active mode, ON-Low-Power or Sleep mode, Retention mode, and OFF mode.

The AVS voltage processor VP suitably waits a somewhat longer period of time than the settling time to ensure voltage control loop stability and have desirable overdamping (non-oscillatory or non-hunting behavior) in the control loop performance. The voltage is changed from one OPP to another OPP in a suitable number of steps to that overdamped performance is maintained. In some embodiments the settling time for widely-separated OPPs is on the order of a millisecond, more or less.

In FIG. 20, the PRM Voltage management has several blocks that manage the different voltage sources. Voltage processors VP convert AVS sensor errors to voltage values sent to the voltage controller VCON. The voltage FSMs 1 and 2 manage respectively VDD1 and VDD2 voltage. They either send commands to the voltage controller (I2C mode) or controls VMODE1 and VMODE2 signals (direct control mode). The voltage controller VCON gathers commands from register (direct access), voltage processors VP and voltage FSMs. VCON then handles communication with the external IC through the dedicated I2C interface. A GPCON FSM controls SRAM and wake-up LDOs, analog cells sleep mode and level shifters. Devices FSM sequences GPCON, voltage FSMs and IO FSM during device OFF sleep and wake-up transitions. IO FSMs manages IO OFF mode control. In this way, static leakage management (SLM) is integrated with DVFS/DPS/AVS active power management.

Figure 21:
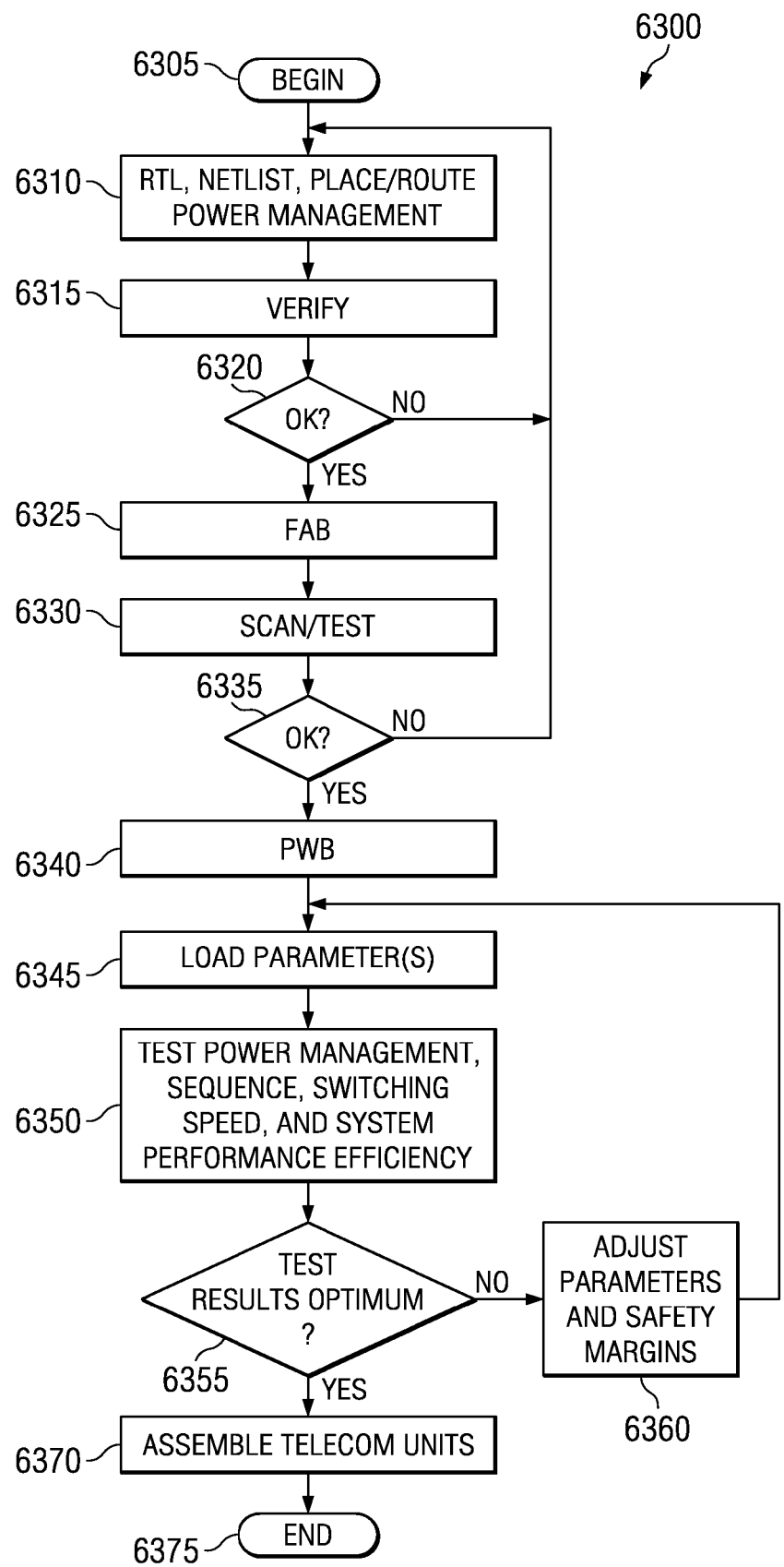
FIG. 21 is a flow diagram of an inventive process of manufacturing various embodiments of the invention.

In FIG. 21, various embodiments as described herein are manufactured in process 6300 as illustrated in the flow of FIG. 21 that begins at step 6305. A step 6310 prepares RTL (register transfer language) and netlist for a particular design including circuits of FIG. 4 and any of PRCM SM and Peripherals SM in any of FIGS. 13-18 in one or more integrated circuits or a system. In a step 6315, the design of global hardware supervised power transition management circuitry for interconnect clock and voltage control and power management of other blocks by combined DVFS/DPS/SLM/AVS, for instance, is verified in simulation electronically on the RTL and netlist. Verification checks contents and timing of shadow and parameter registers, operation of state machine circuits under various configurations, handshakes, compliance with power module dependencies and conditions invoking DVFS, DPS, SLM, AVS, real-time and non-real-time operations and interrupts, responsiveness to Go-bit, START_bit_i, OK_ACK_i, TRANS, DONE, and PER_EN_i, and transitions through handlers, and modes, sleep/wakeup, and various attack scenarios. If verification evaluation step 6320 determines verification is not satisfactory, operations loop back to step 6310. When satisfactory, the verified design dataset and pattern generation dataset go to fabrication step 6325 in a wafer fab and packaging/assembly produces a resulting integrated circuit. Step 6330 tests power management by supplying a controllable clock and/or voltage for the interconnect, operating a processor to make the Go-bit request, and verifying actual successful comprehensive sequencing of the interconnect or other power management transition. Step 6330 verifies operations directly on first-silicon and production samples such as by using scan chain methodology on registers of power management circuitry, peripheral circuitry, and other circuitry. Evaluation decision step 6335 determines whether the chips are satisfactory, and if not satisfactory, the operations loop back as early in the process as step 6310 as needed to get satisfactory integrated circuits.

Step 6340 provides a particular design and printed wiring board (PWB) of the system unit, such as a modem, a processor coupled to a modem, a controlled power management circuitry, one or more peripherals coupled to the processor and state machines, and a user interface coupled to the processor. In a step 6345 a storage, such as SDRAM and Flash memory for coupling to on-chip secure memory, is coupled to the system and has configuration and parameters and a real-time operating system RTOS, Public HLOS, protected applications (PPAs and PAs), and other supervisory software.

Step 6350 tests operations of the power management circuits by confirming rapid interconnect power management transitions, for instance, operations of the integrated circuit(s) and system in actual application. Rapid transitions of OPP voltage and frequency are readily verified by electrical programming and probing the SoC integrated circuit, such as by physical probing or electrically testing via a serial scan chain coupled to the power management state machines and registers described herein, or probing the printed wiring board PWB holding the system. SoC system power consumption is significantly reduced, consequently increasing the battery life of battery 1280 of FIG. 2 and FIG. 23, and thus making various embodiments attractive and competitive on MIPS/Power ratio and other metrics.

In step 6350, verification and test operations are applied pertaining to real-time and non-real-time operations, power management, various real-time scenarios, system stability and performance, power management voltage voting performance and efficiency and satisfactory operation of mobile video display for continuity of content, phone, e-mails/data service, web browsing, voice over packet, content player for continuity of content, camera/imaging, audio/video synchronization, and other such operation that is apparent to the human user and can be evaluated by system use. Also, various attack scenarios are applied.

Step 6360 adjusts parameters of the power management circuitry, the simplified software, and the system for faster application execution, lower power dissipation, and maintained or enhanced QoS (quality of service). Parameters include enable/disable register bits in state machines, shadow registers, parameter registers, and specified DVFS OPPs parameters for them. If further increased efficiency is called for in a step 6355, then step 6360 adjusts or reconfigures parameter(s) and safety margins and loops back to reload parameter(s) at step 6345 and do further testing. When satisfactory at step 6355, operations proceed to step 6370, where adjusted parameter(s) are loaded into the Flash memory or otherwise, components are assembled on PWB to produce resulting system units and END 6375 is reached.

In FIG. 22, an improved communications system 2000 has system blocks as described next and improved with any one, some or all of the circuits and subsystems shown in various Figures of the drawing. Any or all of the system blocks, such as cellular mobile telephone and data handsets 2010 and 2010', a cellular (telephone and data) base station 2050, a WLAN AP (wireless local area network access point, IEEE 802.11 or otherwise) 2060, a Voice over WLAN Gateway 2080 with user voice over packet telephone 2085 (not shown), and a voice enabled personal computer (PC) 2070 with another user voice over packet telephone (not shown), communicate with each other in communications system 2000.

Camera 1490 provides video pickup for cell phone 2020 to send over the internet to cell phone 2010', personal digital assistant/personal entertainment unit PDA/PEU 2096, TV 2094, automobile 2095 and to a monitor of PC 2070 via any one, some or all of cellular base station 2050, DVB station 2020, WLAN AP 2060, STB 2092, and WLAN gateway 2080. Handset 2010 has a video storage and other storage, such as hard drive, flash drive, high density memory, and/or compact disk (CD) in the handset for digital video recording (DVR) such as for delayed reproduction, transcoding, and retransmission of video to other handsets and other destinations.

On a cell phone printed circuit board (PCB) 1020 in handset 2010, is provided a higher-security processor integrated circuit 1022, an external flash memory 1025 and SDRAM 1024, and a serial interface 1026. A PRCM 1050 (1185, 1470 of FIG. 23) is improved as in PRCM 3570 of previous Figures. Serial interface 1026 is suitably a wireline interface, such as a USB interface connected by a USB line to the personal computer 2070 and magnetic and/or optical media 2075. Cell phone 2010 intercommunication also occurs via a cellular modem, WLAN, Bluetooth from a website 2055 or 2065, television and physical layer (PHY) or other circuitry 1028. Processor integrated circuit 1022 has MPU (or CPU) block 1030 coupled to an internal (on-chip read-only memory) ROM 1032, an internal RAM 1034, and flash memory 1036. A security logic circuit 1038 is coupled to secure-or-general-purpose-identification value (Security/GPI) bits 1037 of a non-volatile one-time alterable Production ID register or array of electronic fuses (E-Fuses). Depending on the Security/GPI bits, boot code residing in ROM 1032 responds differently to a Power-On Reset (POR) circuit 1042 and to a secure watchdog circuit 1044 coupled to processor 1030.

In FIG. 23, handset 2010 has an integrated circuit 1100 that includes a digital baseband (DBB) block that has a RISC processor 1105 and a digital signal processor 1110, communications and security software, and security accelerators 1140. A memory controller interfaces the RISC core 1105 and the DSP core 1110 to Flash memory 1025 and SDRAM 1024. On chip RAM 1120 and on-chip ROM 1130 also are accessible to the processors 1110 for providing sequences of software instructions and data thereto. A security logic circuit 1038 of FIGS. 22 and 23 has a secure state machine (SSM) 2460 to provide hardware monitoring of any tampering with security features. A Secure Demand Paging (SDP) circuit 1040 is provided for effectively-extended secure memory.

Digital circuitry 1150 on integrated circuit (IC) 1100 supports and provides wireless interfaces for any one or more of GSM, GPRS, EDGE, UMTS, and OFDMA/MIMO embodiments. Digital circuitry 1160 provides codec for CDMA (Code Division Multiple Access), CDMA2000, and/or WCDMA (wideband CDMA or UMTS) wireless suitably with HSDPA/HSUPA (High Speed Downlink Packet Access, High Speed Uplink Packet Access) (or 1xEV-DV, 1xEV-DO or 3xEV-DV) data feature via the analog baseband chip 1200 and RF GSM/CDMA chip 1300. Audio/voice block 1170 supports audio and speech/voice functions and interfacing. Speech/voice codec(s) and user voice-recognition/voice control are suitably provided in memory space in audio/voice block 1170 for processing by processor(s) 1110. Applications interface 1180 couples the digital baseband 1100 to applications processor 1400. Power resets and control module 1185 provides power management circuitry for chip 1100. IC 1100 is coupled to location-determining circuitry 1190 for GPS (Global Positioning System). IC 1100 is also coupled to a USIM (UMTS Subscriber Identity Module) 1195.

In FIG. 23, a mixed-signal integrated circuit 1200 includes an analog baseband (ABB) block 1210 for GSM/GPRS/EDGE/UMTS/HSDPA/HSUPA and an analogous ABB for CDMA wireless and any associated 1xEV-DV, 1xEV-DO or 3xEV-DV data and/or voice with its respective SPI (Serial Port Interface), digital-to-analog conversion DAC/ADC block, and RF Control pertaining to CDMA and coupled to RF (CDMA) chip 1300. An audio block 1220 has audio I/O (input/output) circuits to a speaker 1222, a microphone 1224, and headphones (not shown). A control interface 1230 has a primary host interface (I/F) and a secondary host interface to DBB-related integrated circuit 1100 of FIG. 2 for the respective GSM and CDMA paths.

A power conversion block 1240 includes buck voltage conversion circuitry for DC-to-DC conversion, and low-dropout (LDO) voltage regulators as in FIG. 2 for power management/sleep mode of respective parts of the chip supplied with voltages VDDx regulated by the LDOs. Power conversion block 1240 provides information to and is responsive to a power control state machine between the power conversion block 1240 and circuits 1250 for clocking chip 1200. A touch screen interface 1260 is coupled to a touch screen XY 1266 off-chip for display and control. Battery 1280 provides power to the system and battery data to circuit 1250 on suitably provided lines from the battery pack.

In FIG. 23 an RF integrated circuit 1300 includes a GSM/GPRS/EDGE/UMTS/CDMA/MIMO-OFDMA RF transmitter block 1310 fed by baseband block 1210 of chip 1200, and Transmitter 1310 drives a dual band RF power amplifier (PA) 1330. Switchplexer 1350 couples antenna and switch to both the transmit portion 1310, 1330 via band-pass filters 1360 to receiving LNAs (low noise amplifiers) coupled to GSM/GPRS/EDGE/UMTS/CDMA demodulator 1370 to produce I/Q (in-phase, quadrature outputs) to baseband block 1210. Replication of blocks and antennas is provided in a cost-efficient manner to support MIMO OFDMA.

Chip 1400 has an applications processing section 1420 RISC processor 1422 (such as MIPS core(s), ARM core(s), or other suitable processor), a digital signal processor 1424, and a shared memory controller MEM CTRL 1426 with DMA (direct memory access), and a 2D/3D graphic accelerator. Speech/voice codec functionality is processed. Off-chip memory resources 1435 include DRAM and flash memory. Shared memory controller 1426 interfaces the RISC processor 1422 and the DSP 1424 via an on-chip bus to on-chip memory 1440 with RAM and ROM. Security logic 1038 of FIG. 22 and FIG. 23 (1038, 1450) includes hardware-based protection circuitry, also called security monitoring logic or a secure state machine SSM 2460 to monitor busses and other parts for security violations. A JTAG emulation interface couples to an off-chip emulator Debugger, I2C interfaces to analog baseband ABB chip 1200, and an interface couples to applications interface 1180.

DLP™ display technology from Texas Instruments Incorporated is coupled to interface 1410. A transparent organic semiconductor display is provided on one or more windows of the vehicle 2095 of FIG. 1 and wirelessly or wireline-coupled to the video feed.

In FIG. 23, a WLAN and/or WiMax integrated circuit 1500 includes MAC (media access controller) 1510, PHY (physical layer) 1520 and AFE (analog front end) 1530. A MIMO UWB (ultra wideband) MAC/PHY supports OFDM in 3-10 GHz. UWB bands. communications in some embodiments. A digital video integrated circuit 1610 provides television antenna 1615 tuning, antenna selection, filtering, RF input stage for recovering video/audio/controls from DVB station 2020 of FIG. 22.

Various embodiments are used with one or more microprocessors, each microprocessor having a pipeline is selected from the group consisting of 1) reduced instruction set computing (RISC), 2) digital signal processing (DSP), 3) complex instruction set computing (CISC), 4) ASPECTS (See Notes Paragraph at End of this Aspects Section.)

1A. The electronic circuit claimed in claim 1 wherein said peripheral is operable for burst traffic and is responsive to the first signal to complete the burst traffic prior to stalling operation on said bus.

1B. The electronic circuit claimed in claim 1 further comprising a second peripheral coupled to said bus, the second peripheral having a storing circuit for a second succession-presetting and a second parameter setting currently-effective for second peripheral operation on said bus, said peripheral is responsive to the first signal to stall second peripheral operation on said bus, said second peripheral operable to automatically promote the second succession pre-setting to currently-effective status for the second peripheral after second peripheral operations on said bus are stalled and responsive to the second signal to re-enable second peripheral operation on said bus.

1B1. The electronic circuit claimed in claim 1B wherein said second peripheral is responsive with a second handshake signal to the power management circuit when the second peripheral operation on said bus is stalled, and said power management circuit is responsive to occurrence of both the handshake signal from the first peripheral and the second handshake signal to initiate the bus frequency transition.

1B1A. The electronic circuit claimed in claim 1B1 wherein the combination of power management circuit and said peripherals is operable to contain a time interval to five (5) microseconds or less between either handshake signal from a peripheral and the second signal from the power management circuit and with peripherals operation with their buffers uninterrupted by the stall of peripheral operations on said bus.

1C. The electronic circuit claimed in claim 1 further comprising a bus frequency circuit operable to establish a bus frequency for said bus in accordance with a currently-effective setting, the bus frequency circuit having another succession pre-setting, wherein said power management circuit is operable to send a third signal to the bus frequency circuit to promote that succession pre-setting to currently-effective status in the bus frequency circuit, whereby the bus frequency transition is initiated.

1C1. The electronic circuit claimed in claim 1C wherein said power management circuit is operable to pre-program that frequency-related setting in the bus frequency circuit in advance of said third signal.

1C2. The electronic circuit claimed in claim 1C wherein said bus frequency circuit is further operable to send a fourth signal to the power management circuit representing that the bus frequency transition is done.

1D. The electronic circuit claimed in claim 1 further comprising a processor coupled to said bus and having a processor data buffer and said processor operable for processing a signal stream with the processor data buffer during the bus frequency transition.

1E. The electronic circuit claimed in claim 1 further comprising a memory and wherein said peripheral includes a memory controller coupled to said memory.

1P. A process of operating an electronic circuit, the process including
  storing a succession-presetting and a parameter setting currently-effective for peripheral operation on a bus,
  operating a power management circuit in response to a power management transition request to send a first signal, and to initiate a bus frequency transition, and to send a second signal after the bus frequency transition, and
  operating in a peripheral in response to the first signal to stall peripheral operation on the bus, automatically promoting the succession pre-setting to currently-effective status for the peripheral after peripheral operations on said bus are stalled, and re-enabling peripheral operation on the bus.

11P. A process of power management comprising responding to a power management transition request to activate a transition initiation signal and then responding to a transition initiation acknowledgment to activate a frequency control and then responding to a frequency stabilization signal to activate a transition completion signal.

14P. A process of operating an electronic peripheral, the process comprising:
  responding to a transition initiation signal to disable at least part of a bus interface circuit;
  transferring current effectiveness between at least two of the successively applicable power management related control parameter values; and
  responding to a re-enabling signal to re-enable the disabled part of the bus interface circuit.

19P. A process of operating an electronic image processing system, the process comprising:
  storing in an image peripheral a succession-presetting and a parameter setting currently-effective for image peripheral operation on said bus;
  operating a processor to pre-program the succession pre-setting in the image peripheral and generating a power management transition request;
  operating a power management circuit in response to the power management transition request to send a first signal to the image peripheral, and initiating a bus frequency transition, and sending a second signal to the image peripheral after the bus frequency transition, and operating the image peripheral in response to the first signal to stall image peripheral operation on the bus, automatically promoting the succession pre-setting to currently-effective status for the image peripheral after image peripheral operations on said bus are stalled and responding to the second signal to re-enable image peripheral operation on the bus.

Notes: Aspects are paragraphs which might be offered as claims in patent prosecution. The above dependently-written Aspects have leading digits and internal dependency designations to indicate the claims or aspects to which they pertain. Aspects having no internal dependency designations have leading digits and alphanumerics to indicate the position in the ordering of claims at which they might be situated if offered as claims in prosecution.

Processing circuitry comprehends digital, analog and mixed signal (digital/analog) integrated circuits, ASIC circuits, PALs, PLAs, decoders, memories, and programmable and nonprogrammable processors, microcontrollers and other circuitry. Internal and external couplings and connections can be ohmic, capacitive, inductive, photonic, and direct or indirect via intervening circuits or otherwise as desirable. Process diagrams herein are representative of flow diagrams for operations of any embodiments whether of hardware, software, or firmware, and processes of manufacture thereof. Flow diagrams and block diagrams are each interpretable as representing structure and/or process. While this invention has been described with reference to illustrative embodiments, this description is not to be construed in a limiting sense. Various modifications and combinations of the illustrative embodiments, as well as other embodiments of the invention may be made. The terms "including", "includes", "having", "has", "with", or variants thereof are used in the detailed description and/or the claims to denote non-exhaustive inclusion in a manner similar to the term "comprising". The appended claims and their equivalents cover any such embodiments, modifications, and embodiments as fall within the scope of the invention.

What is claimed is:

1. An electronic circuit comprising
a bus;
a peripheral coupled to said bus, the peripheral having a storing circuit for a succession-presetting and a parameter setting currently-effective for peripheral operation on said bus; and
a power management circuit operable in response to a power management transition request to send a first signal to said peripheral, and to initiate a bus frequency transition, and to send a second signal to the peripheral after the bus frequency transition, and
said peripheral is responsive to the first signal to stall peripheral operation on said bus, said peripheral operable to automatically promote the succession pre-setting to currently-effective status for the peripheral after peripheral operations on said bus are stalled and responsive to the second signal to re-enable peripheral operation on said bus.

2. The electronic circuit claimed in claim 1 further comprising a processor operable to pre-program the succession pre-setting in the peripheral.

3. The electronic circuit claimed in claim 1 further comprising a processor operable to issue the power management transition request to the power management circuit.

4. The electronic circuit claimed in claim 1 wherein said peripheral is responsive with a handshake signal to the power management circuit when the peripheral operation on said bus is stalled, and said power management circuit is responsive to the handshake signal to initiate the bus frequency transition.

5. The electronic circuit claimed in 1 wherein said storing circuit includes a buffer, and said peripheral is operable to continue peripheral operations with said buffer regardless of whether peripheral operation on said bus is stalled.

6. The electronic circuit claimed in claim 5 wherein said peripheral is responsive with a handshake signal to the first signal from said power management circuit, and said buffer has a buffer signal representing a state of readiness, and said handshake signal depends on the buffer signal.

7. The electronic circuit claimed in claim 1 wherein the combination of power management circuit and peripheral is operable to contain a time interval between the first and second signals to five (5) microseconds or less and with peripheral operations with said buffer uninterrupted by the stall of peripheral operations on said bus.

8. The electronic circuit claimed in claim 1 further comprising a memory controller peripheral having a storing circuit for a second succession-presetting and a second parameter setting currently-effective for memory controller operation on said bus, said memory controller responsive to the first signal to stall memory controller operation on said bus and to automatically promote the second succession pre-setting to currently-effective status for the memory controller and responsive to the second signal to re-enable memory controller operation on said bus.

9. The electronic circuit claimed in claim 1 further comprising a memory controller coupled to said bus and to a memory and said memory controller operable to send a memory controller reporting signal to said power management circuit representing memory usage, with said power management transition request a function of the memory controller reporting signal.

10. The electronic circuit claimed in claim 1 further comprising a direct memory access (DMA) controller coupled to said bus and said DMA controller operable to send a DMA reporting signal to said power management circuit representing DMA load, with said power management transition request a function of the DMA reporting signal.

11. A power management article comprising:
an input for a power management transition request;
an output for a transition initiation signal;
an input for a transition initiation acknowledgment;
an output for a frequency control;
an input for a frequency stabilization signal;
an output for a transition completion signal; and
a state machine responsive to the input for the power management transition request to activate the output for a transition initiation signal and then responsive to the input for the transition initiation acknowledgment to activate the output for the frequency control and then responsive to the input for the frequency stabilization signal to activate the output for the transition completion signal.

12. The power management article claimed in claim 11 further comprising a second input for a second transition initiation acknowledgment, and said state machine responsive to said first-named and second transition initiation acknowledgments to activate the output for frequency control.

13. The power management article claimed in claim 11 further comprising a combining circuit having a plurality of transition initiation acknowledgment inputs, said combining circuit jointly responsive to the transition initiation acknowledgment inputs to supply said input for a transition initiation acknowledgment to said state machine.

14. An electronic peripheral comprising:
a functional circuit for establishing peripheral functionality;
a bus interface circuit coupled to said storage circuit;
a storage circuitry coupled to said functional circuit and to said bus interface circuit, said storage circuit having a data buffer and a space for successively applicable power management related control parameter values; and
a peripheral controller responsive to a transition initiation signal to disable at least part of the bus interface circuit, and to transfer current effectiveness between at least two of the successively applicable power management related control parameter values, and responsive to a re-enabling signal to re-enable the disabled part of the bus interface circuit.

15. The electronic peripheral claimed in claim 14 wherein said peripheral controller is further responsive to the transition initiation signal to activate a handshake acknowledgment output.

16. The electronic peripheral claimed in claim 14 wherein said bus interface circuit has a part operable for burst traffic and said peripheral controller is further responsive to the transition initiation signal to disable the part operable for burst traffic when that part has completed transfer of pending burst traffic.

17. The electronic peripheral claimed in claim 14 wherein the bus interface is coupled to said storage for control of bus interface operation based on a currently-effective control parameter value.

18. The electronic peripheral claimed in claim 14 wherein said peripheral controller is further responsive to a control code input to determine which of the power management related control parameter values becomes currently-effective.

19. An electronic image processing system comprising:
processing circuitry operable for image processing;
a bus coupled to said processing circuitry;
an image peripheral coupled to said bus, the image peripheral having a storing circuit for a succession-presetting and a parameter setting currently-effective for image peripheral operation on said bus, said processor operable to pre-program the succession presetting in the image peripheral and to generate a power management transition request; and
a power management circuit operable in response to the power management transition request to send a first signal to said image peripheral, and to initiate a bus frequency transition, and to send a second signal to the image peripheral after the bus frequency transition, and
said image peripheral is responsive to the first signal to stall image peripheral operation on said bus, said image peripheral operable to automatically promote the succession pre-setting to currently-effective status for the image peripheral after image peripheral operations on said bus are stalled and responsive to the second signal to re-enable image peripheral operation on said bus.

20. The electronic image processing system claimed in claim 19 further comprising a wireless modem coupled to said processing circuitry, and a display coupled to said image peripheral.

21. The electronic image processing system claimed in claim 19 further comprising a camera sensor coupled to said image peripheral.

22. A manufacturing process comprising
preparing design code representing a peripheral having a bus interface and a register field for a current setting related to power management and a register field for a shadow setting related to power management and a power management circuit coupled to the peripheral to stall the bus interface and promote a shadow setting to the current setting, and re-enable the bus interface; and
making at least one integrated circuit by wafer fabrication responsive to said design code.

* * * * *